(12) United States Patent
Fujimoto

(10) Patent No.: US 11,189,406 B2
(45) Date of Patent: *Nov. 30, 2021

(54) MAGNETIC POWDER, MANUFACTURING METHOD OF MAGNETIC POWDER, AND MAGNETIC RECORDING MEDIUM

(71) Applicant: FUJIFILM Corporation, Tokyo (JP)

(72) Inventor: Takashi Fujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 576 days.

This patent is subject to a terminal disclaimer.

(21) Appl. No.: 15/993,797

(22) Filed: May 31, 2018

(65) Prior Publication Data

US 2018/0358156 A1 Dec. 13, 2018

(30) Foreign Application Priority Data

Jun. 9, 2017 (JP) .............................. JP2017-114788

(51) Int. Cl.
 *H01F 1/11* (2006.01)
 *G11B 5/65* (2006.01)
 *G11B 5/706* (2006.01)

(52) U.S. Cl.
 CPC ............... *H01F 1/11* (2013.01); *G11B 5/653* (2013.01); *G11B 5/70642* (2013.01)

(58) Field of Classification Search
 CPC ... G11B 5/70; G11B 5/70615; G11B 5/70621; G11B 5/70642; G11B 5/70663; G11B 5/653; C01G 49/0018; C01G 49/06; C01G 49/02; H01F 1/11

See application file for complete search history.

(56) References Cited

U.S. PATENT DOCUMENTS

| 10,255,938 B2 * | 4/2019 | Hiroi | G11B 5/70 |
| 2017/0287516 A1 | 10/2017 | Sakane et al. | |
| 2018/0005737 A1 | 1/2018 | Sakane et al. | |

FOREIGN PATENT DOCUMENTS

| JP | 2008-60293 A | 3/2008 |
| JP | 2009-001475 A | 1/2009 |
| JP | 2016-098131 A | 5/2016 |
| JP | 2016-130208 A | 7/2016 |
| JP | 2016-174135 A | 9/2016 |
| JP | 2017-024981 A | 2/2017 |
| WO | 2008/149785 A1 | 12/2008 |

OTHER PUBLICATIONS

Communication dated Jan. 28, 2020, from the Japanese Patent Office in application No. 2017-114788.
Notice of Reasons for Refusal dated Aug. 11, 2020 from the Japanese Patent Office in Application No. 2017-114788.
Communication dated Oct. 5, 2021, issued by the Japanese Patent Office in counterpart Japanese Application No. 2020-196850.

* cited by examiner

*Primary Examiner* — Holly Rickman
(74) *Attorney, Agent, or Firm* — Sughrue Mion, PLLC

(57) ABSTRACT

Magnetic powder includes: an epsilon-phase iron oxide-based compound selected from $\varepsilon\text{-Fe}_2\text{O}_3$ or a compound represented by Formula (1). The magnetic powder has an average particle diameter of 8 nm to 25 nm, a ratio of Hc to Hc' of from 0.6 to 1.0, and Hc' satisfying Expression (II). Hc' represents a magnetic field at which a value of Expression (I) becomes zero in a magnetic field-magnetization curve obtained by performing measurement at a maximum applied magnetic field of 359 kA/m, a temperature of 296 K, and a magnetic field sweeping speed of 1.994 kA/m/s. M represents magnetization and H represents applied magnetic field. Hc represents a magnetic field at which magnetization becomes zero in the magnetic field-magnetization curve. In Formula (1), A represents at least one metal element other than Fe, and a represents a number that satisfies a relationship of 0<a<2.

$d^2M/dH^2$ Expression (I)

119 kA/m<$Hc'$<2380 kA/m Expression (II)

$\varepsilon\text{-A}_a\text{Fe}_{2-a}\text{O}_3$ (1)

8 Claims, No Drawings

MAGNETIC POWDER, MANUFACTURING METHOD OF MAGNETIC POWDER, AND MAGNETIC RECORDING MEDIUM

CROSS-REFERENCE TO RELATED APPLICATION

This application is based on and claims priority under 35 USC 119 from Japanese patent Application No. 2017-114788, filed Jun. 9, 2017, the disclosure of which is incorporated by reference herein.

BACKGROUND OF THE INVENTION

1. Field of the Invention

The present invention relates to magnetic powder, a manufacturing method of magnetic powder, and a magnetic recording medium.

2. Description of the Related Art

As magnetic powder used in a magnetic recording medium, hexagonal barium ferrite powder and the like are widely used. The hexagonal barium ferrite powder has a plate shape and can achieve a high filling percentage. However, in recent years, magnetic higher-performance magnetic powder is required along with realization of high performance of a magnetic recording medium.

For example, $\varepsilon\text{-Fe}_2O_3$ is attracting attention as a next-generation magnetic material, due to a great anisotropy field (hereinafter, may be referred to as Hk) and magnetization held even in a case of using particles having a smaller size, and accordingly, magnetic powder including $\varepsilon\text{-Fe}_2O_3$ and having an improved particle size distribution has been proposed (see JP2017-24981A).

As magnetic powder including $\varepsilon\text{-Fe}_2O_3$, magnetic particles in which, in a differential curve which is obtained by numerical differentiation of a magnetic field-magnetization curve which is obtained by measuring intensity of magnetization of magnetic powder with respect to a magnetic field applied under specific conditions, a ratio of intensity of a section of a vertical axis in a zero magnetic field of the curve with respect to intensity of a peak appearing on a high magnetic field side is equal to or smaller than 0.7, and an average particle diameter is 10 nm to 30 nm (for example, see JP2016-174135A), and magnetic particles in which a ratio of a maximum value of diffraction intensity excluding background in a case of performing X-ray diffraction measurement in which 2θ is 27.2° to 29.7°, with respect to a maximum value of diffraction intensity excluding background in a case of performing X-ray diffraction measurement in which 2θ is 42° to 44°, is equal to or smaller than 0.1, in addition to the conditions of JP2016-174135A (for example, see JP2016-130208A) have been proposed as magnetic powder which has a small content of fine particles not contributing to magnetic recording properties, and narrow coercivity distribution, and is suitable for realization of high recording density of a magnetic recording medium.

SUMMARY OF THE INVENTION

However, it is found that, in a case where the magnetic particles obtained by simply narrowing particle size distribution of magnetic powder including $\varepsilon\text{-Fe}_2O_3$ or adjusting magnetic properties of fine particles to be in the range of JP2016-174135A or JP2016-130208A are used in a magnetic recording medium, durability in a case of repeated reproducing due to signal decay is not sufficiently obtained. It is thought that this is because the control of particles not contributing to magnetization does not relate to simple control of a particle size, but relates to physical properties of a magnetic powder precursor.

In addition, in the invention of JP2016-174135A or JP2016-130208A, as means for controlling values of physical properties of magnetic powder, removal of unnecessary ions by ultrafiltration is performed in a case of manufacturing a magnetic powder precursor. However, according to the studies of the inventors, it is determined that, in a case where a crystal structure is focused, the amount of an amorphous portion of metal powder increases, in a magnetic powder precursor formed under the conditions of a step of forming metal powder including iron, by using an aqueous solution of a compound including a trivalent iron ion, and although unnecessary ions are removed after forming a magnetic powder precursor, the magnetic powder precursor already formed includes an amorphous component, and accordingly, finally, the amount of fine particles generated due to the amorphous portion increases and this may affect magnetic properties.

That is, in the related art, tests regarding the magnetic powder including $\varepsilon\text{-Fe}_2O_3$ for improving magnetic properties have been made. However, in a case of applying magnetic powder including $\varepsilon\text{-Fe}_2O_3$ to a magnetic recording medium, not only excellent magnetic properties, but also prevention of signal decay is important, from a viewpoint of durability in a case of a long term use. In regards to this, it is clear from the studies of the inventors, that signal decay is not sufficiently prevented and a problem occurs regarding durability in a case of repeated use, in the magnetic recording media including $\varepsilon\text{-Fe}_2O_3$ in a magnetic layer disclosed in JP2017-24981A, JP2016-174135A, JP2016-130208A.

An object of one embodiment of the invention is to provide magnetic powder which has excellent magnetic properties and in which signal decay is prevented, in a case of being applied to a magnetic recording medium.

Another object of the embodiment of the invention is to provide a manufacturing method of magnetic powder which has excellent magnetic properties and in which signal decay is prevented, in a case of being applied to a magnetic recording medium.

Still another object of the embodiment of the invention is to provide a magnetic recording medium in which signal decay is prevented.

Means for achieving the aforementioned objects include the following aspects.

<1> Magnetic powder comprising: at least one epsilon-phase iron oxide-based compound selected from the group consisting of $\varepsilon\text{-Fe}_2O_3$ and a compound represented by Formula (1), in which the magnetic powder has an average particle diameter of 8 nm to 25 nm, a ratio of Hc to Hc' is from 0.6 to 1.0, and Hc' satisfies Expression (II), wherein Hc' represents a magnetic field at which a value of Expression (I) indicating a second derivative of magnetization M with respect to an applied magnetic field H becomes zero in a magnetic field-magnetization curve obtained by performing measurement at a maximum applied magnetic field of 359 kA/m, a temperature of 296 K, and a magnetic field sweeping speed of 1.994 kA/m/s, and Hc represents a magnetic field at which magnetization becomes zero in the magnetic field-magnetization curve.

$d^2M/dH^2$          Expression (I)

119 kA/m<$Hc'$<2380 kA/m         Expression (II)

          (1)

In Formula (1), A represents at least one metal element other than Fe and a represents a number that satisfies a relationship of 0<a<2.

<2> The magnetic powder according to <1>, in which the compound represented by Formula (1) is a compound represented by Formula (1-2).

$$\varepsilon\text{-}A^1_xA^2_yA^3_zFe_{(2-x-y-z)}O_3 \qquad (1\text{-}2)$$

In Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, $A^3$ represents at least one tetravalent metal element selected from the group consisting of Ti and Sn. x represents a number that satisfies a relationship of 0<x<1, y represents a number that satisfies a relationship of 0<y<1, z represents a number that satisfies a relationship of 0<z<1, and x+y+z<2.

<3> The magnetic powder according to <1> or <2>, in which a total content of at least one iron oxide-based compound selected $\alpha$-$Fe_2O_3$ and $\gamma$-$Fe_2O_3$ is equal to or smaller than 20 parts by mass with respect to 100 parts by mass of a total content of the at least one epsilon-phase iron oxide-based compound selected from the group consisting of $\varepsilon$-$Fe_2O_3$ and the compound represented by Formula (1).

<4> The magnetic powder according to any one of <1> to <3>, in which a content of magnetic powder having a particle diameter equal to or smaller than 7.5 nm with respect to a total content of magnetic powder is equal to or smaller than 5% by number.

<5> A manufacturing method of magnetic powder, comprising:

mixing an aqueous solution of a compound including a trivalent iron ion as a raw material of magnetic powder, with an alkali agent, to obtain a mixed solution I;

mixing the mixed solution I with a polyvalent carboxylic acid aqueous solution to obtain a mixed solution II, stirring the mixed solution II, and separating a solid component from the mixed solution II after the stirring;

re-dispersing the solid component in a dispersion medium including water, adding an alkali agent, and adding a silyl compound including a hydrolyzable group, to obtain a dispersion liquid;

incorporating a component capable of aggregating the solid component by salting out into the dispersion liquid, and separating a generated precipitate, to obtain a magnetic powder precursor;

subjecting the magnetic powder precursor to heat treatment at a temperature condition of 800° C. to 1,400° C.; and removing a silicic acid compound in the heat-treated magnetic powder precursor by using an alkali aqueous solution.

<6> The manufacturing method of magnetic powder according to <5>, in which the mixing of the aqueous solution of the compound including a trivalent iron ion with the alkali agent further includes adding at least one selected from polyvinylpyrrolidone or hexadecyltrimethylammonium bromide.

<7> A magnetic recording medium comprising: a non-magnetic support; and a magnetic layer including the magnetic powder according to any one of <1> to <4> and provided on the non-magnetic support.

According to one embodiment of the invention, it is possible to provide magnetic powder which has excellent magnetic properties and in which signal decay is prevented, in a case of being applied to a magnetic recording medium.

According to another embodiment of the invention, it is possible to provide a manufacturing method of magnetic powder which has excellent magnetic properties and in which signal decay is prevented, in a case of being applied to a magnetic recording medium.

According to still another embodiment of the invention, it is possible to provide a magnetic recording medium in which signal decay is prevented.

DESCRIPTION OF THE PREFERRED EMBODIMENTS

Hereinafter, examples of specific embodiments of the invention will be described in detail, but the following embodiments are merely examples, and the invention is not limited to the following descriptions and can be performed with suitable changes within a desired range of the invention.

In this specification, a numerical value range shown with "to" indicates a range including numerical values written before and after "to", respectively as the minimum value and the maximum value.

In this specification, in a case where a plurality of kinds of substances corresponding to each component are included in a composition, the amount of each component included in the composition means a total amount of the plurality of kinds of substances, unless otherwise noted.

In the numerical value range disclosed in a stepwise manner in this specification, an upper limit value or a lower limit value disclosed in a certain numerical value range may be replaced with an upper limit value or a lower limit value of another numerical value range disclosed in a stepwise manner. In addition, in the numerical value range disclosed in this specification, an upper limit value or a lower limit value disclosed in a certain numerical value range may be replaced with values shown in examples.

In this specification, a term "step" not only means an independent step, but also includes a step, as long as the intended object of the step is achieved, even in a case where the step cannot be clearly distinguished from another step.

Magnetic Powder

Magnetic powder of this disclosure includes: at least one epsilon-phase iron oxide-based compound selected from the group consisting of $\varepsilon$-$Fe_2O_3$ and a compound represented by Formula (1), in which the magnetic powder has an average particle diameter of 8 nm to 25 nm, in a case where a magnetic field which is obtained by a magnetic field-magnetization curve obtained by performing measurement at a maximum applied magnetic field of 359 kA/m, a temperature of 296 K, and a magnetic field sweeping speed of 1.994 kA/m/s and in which a value of Expression (I) obtained by second derivative of magnetization M with respect to an applied magnetic field H becomes zero is set as Hc', and a value of a magnetic field in which magnetization becomes zero in the magnetic field-magnetization curve is set as Hc, a ratio of Hc to Hc' is from 0.6 to 1.0, and Hc' satisfies Expression (II).

$d^2M/dH^2$   Expression (I)

119 kA/m<$Hc'$<2380 kA/m   Expression (II)

$$\varepsilon\text{-}A_aFe_{2-a}O_3 \tag{1}$$

In Formula (1), A represents at least one metal element other than Fe, and a represents a number that satisfies a relationship of 0<a<2.

Hereinafter, magnetic powder formed of at least one epsilon-phase iron oxide-based compound selected from the group consisting of $\varepsilon\text{-}Fe_2O_3$ and the compound represented by Formula (1) and particles before being subjected to an alignment process are collectively referred to as "specific magnetic powder".

In general, it is difficult to hold magnetization with metal particles having a fine size, but $\varepsilon\text{-}Fe_2O_3$ has a great anisotropy field (Hk) as described above, and thus, it is possible to hold magnetization even with particles having a fine size. However, even in a case of the magnetic powder including $\varepsilon\text{-}Fe_2O_3$, a superparamagnetic component not having magnetism is easily included, in a case where an average particle diameter is decreased. The superparamagnetic component does not contribute to magnetic recording and magnetization reversal easily occurs due to thermal fluctuation, and thus, signal decay of magnetic powder easily occurs.

In the magnetic powder of this disclosure, the inventors focused on magnetic properties of the magnetic powder and achieved the prevention of signal decay by controlling the magnetic properties.

Specific Magnetic Powder

Examples of the iron oxide-based compound represented by Formula (1) which can be included in the specific magnetic powder include a compound represented by Formula (1-2), a compound represented by Formula (2), a compound represented by Formula (3), a compound represented by Formula (4), a compound represented by Formula (5), and a compound represented by Formula (6), and the compound represented by Formula (1-2) is preferable.

$$\varepsilon\text{-}A^1_xA^2_yA^3_zFe_{(2-x-y-z)}O_3 \tag{1-2}$$

In Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, and $A^3$ represents at least one tetravalent metal element selected from the group consisting of Ti and Sn. x represents a number that satisfies a relationship of 0<x<1, y represents a number that satisfies a relationship of 0<y<1, z represents a number that satisfies a relationship of 0<z<1, and x+y+z<2.

In Formula (1-2), regarding $A^1$, $A^2$, and $A^3$, $A^1$ is preferably a metal element selected from Ga or Al, $A^2$ is preferably a metal element selected from Co or Mn, and $A^3$ is preferably Ti, from viewpoints of stabilization of an ε phase and magnetic properties.

In Formula (1-2), regarding x, y, and z, from a viewpoint of preferable magnetic properties to be applied to a magnetic recording medium, x preferably satisfies a relationship of 0<x<0.7, y preferably satisfies a relationship of 0<y<0.4, z preferably satisfies a relationship of 0<z<0.4, x more preferably satisfies a relationship of 0.05<x<0.4, y more preferably satisfies a relationship of 0.01<y<0.2, and z more preferably satisfies a relationship of 0.01<z<0.2.

Specific examples of the compound represented by Formula (1-2) include $\varepsilon\text{-}Ga_{0.24}Co_{0.05}Ti_{0.05}Fe_{1.66}O_3$, $\varepsilon\text{-}Al_{(0\text{-}20)}Co_{(0.06)}Ti_{(0.06)}Fe_{(1.68)}O_3$, and $\varepsilon\text{-}Ga_{(0.15)}Mn_{(0.05)}Ti_{(0.05)}Fe_{(1.75)}O_3$.

$$\varepsilon\text{-}Z_zFe_{2-z}O_3 \tag{2}$$

In Formula (2), Z represents at least one trivalent metal element selected from the group consisting of Ga, Al, and In. z represents a number that satisfies a relationship of 0<z<2.

In Formula (2), Z is preferably a metal element selected from Ga or Al, from a viewpoint of stabilization of an ε phase.

z preferably satisfies a relationship of 0<z<0.8 and more preferably satisfies a relationship of 0.05<z<0.6, from a viewpoint of magnetic properties.

Specific examples of the compound represented by Formula (2) include $\varepsilon\text{-}Ga_{(0.55)Fe}(_{1.45})O_3$ and $\varepsilon\text{-}Al_{(0.45)}Fe_{(1.55)}O_3$.

$$\varepsilon\text{-}X_xY_yFe_{2-x-y}O_3 \tag{3}$$

In Formula (3), X represents at least one divalent metal element selected from the group consisting of Co, Ni, Mn, and Zn, and Y represents at least one tetravalent metal element selected from the group consisting of Ti and Sn. x represents a number that satisfies a relationship of 0<x<1 and y represents a number that satisfies a relationship of 0<y<1.

In Formula (3), X is preferably a metal element selected from Co or Mn and Y is preferably Ti, from a viewpoint of magnetic properties.

x preferably satisfies 0<x<0.4, y preferably satisfies 0<y<0.4, x more preferably satisfies 0<x<0.2, and y more preferably satisfies 0<y<0.2, from a viewpoint of stabilization of an ε phase.

Specific examples of the compound represented by Formula (3) include $\varepsilon\text{-}Co_{(0.05)}Ti_{(0.05)}Fe_{(1.9)}O_3$ and $\varepsilon\text{-}Mn_{(0.075)}Ti_{(0.075)}Fe_{(1.85)}O_3$.

$$\varepsilon\text{-}X_xZ_zFe_{2-x-z}O_3 \tag{4}$$

In Formula (4), X represents at least one divalent metal element selected from the group consisting of Co, Ni, Mn, and Zn, and Z represents at least one trivalent metal element selected from the group consisting of Ga, Al, and In. x represents a number that satisfies a relationship of 0<x<1 and z represents a number that satisfies a relationship of 0<z<1.

In Formula (4), X is preferably a metal element selected from Co or Mn, and Z is preferably a metal element selected from Ga or Al, from viewpoints of stabilization of an ε phase and magnetic properties.

x preferably satisfies 0<x<0.4, z preferably satisfies a relationship of 0<z<0.4, x more preferably satisfies a relationship of 0<x<0.2, and z more preferably satisfies a relationship of 0.05<z<0.6, from viewpoints of stabilization of an ε phase and magnetic properties.

Specific examples of the compound represented by Formula (4) include $\varepsilon\text{-}Mn_{(0.02)}Ga_{(0.5)}Fe_{(1.48)}O_3$ and $\varepsilon\text{-}Co_{(0.02)}Ga_{(0.4)}Fe_{(1.58)}O_3$.

$$\varepsilon\text{-}Y_yZ_zFe_{2-y-z}O_3 \tag{5}$$

In Formula (5), Y represents at least one tetravalent metal element selected from the group consisting of Ti and Sn, and Z represents at least one trivalent metal element selected from the group consisting of Ga, Al, and In. y represents a number that satisfies a relationship of 0<y<1 and z represents a number that satisfies a relationship of 0<z<1.

In Formula (5), Y is preferably Ti, and Z is preferably a metal element selected from Ga or Al, from viewpoints of stabilization of an ε phase and magnetic properties.

y preferably satisfies a relationship of 0<y<0.4, z preferably satisfies a relationship of 0<z<0.8, y more preferably satisfies a relationship of 0<y<0.2, and z more preferably satisfies a relationship of 0.05<z<0.6, from viewpoints of stabilization of an ε phase and magnetic properties.

Specific examples of the compound represented by Formula (5) include ε-Ti$_{(0.02)}$Ga$_{(0.5)}$Fe$_{(1.48)}$O$_3$ and ε-Ti$_{(0.02)}$Al$_{(0.5)}$Fe$_{(1.48)}$O$_3$.

$$\varepsilon\text{-}X_xY_yZ_zFe_{2-x-y-z}O_3 \tag{6}$$

In Formula (6), X represents at least one divalent metal element selected from the group consisting of Co, Ni, Mn, and Zn, Y represents at least one tetravalent metal element selected from the group consisting of Ti and Sn, and Z represents at least one trivalent metal element selected from the group consisting of Ga, Al, and In. x represents a number that satisfies a relationship of 0<x<1, y represents a number that satisfies a relationship of 0<y<1, z represents a number that satisfies a relationship of 0<z<1, and x+y+z<2.

In Formula (6), X is preferably a metal element selected from Co or Mn, Y is preferably Ti, and Z is preferably a metal element selected from Ga or Al, from viewpoints of stabilization of an ε phase and magnetic properties.

In Formula (6), regarding x, y, and z, from a viewpoint of preferable magnetic properties to be applied to a magnetic recording medium, x preferably satisfies a relationship of 0<x<0.4, y preferably satisfies a relationship of 0<y<0.7, z preferably satisfies a relationship of 0<z<0.4, x more preferably satisfies a relationship of 0.01<x<0.2, y more preferably satisfies a relationship of 0.05<y<0.4, and z more preferably satisfies a relationship of 0.01<z<0.2.

Specific examples of the compound represented by Formula (6) include ε-Ga$_{0.24}$Co$_{0.05}$Ti$_{0.05}$Fe$_{1.66}$O$_3$, ε-Al$_{(0.20)}$Co$_{(0.06)}$Ti$_{(0.06)}$Fe$_{(1.68)}$O$_3$, and ε-Ga$_{(0.15)}$Mn$_{(0.05)}$Ti$_{(0.05)}$Fe$_{(1.75)}$O$_3$.

A confirmation method of a composition and a crystal structure of an iron oxide-based compound is described in examples.

Physical Properties of Magnetic Powder

As physical properties of the magnetic powder of this disclosure, it is determined that, by controlling the following physical properties obtained from a magnetic field-magnetization curve, a preferable signal decay prevention effect is obtained in the magnetic powder.

Specifically, in a case where a magnetic field which is obtained by a magnetic field-magnetization curve obtained by performing measurement at a maximum applied magnetic field of 359 kA/m, a temperature of 296 K, and a magnetic field sweeping speed of 1.994 kA/m/s and in which a value of Expression (I) obtained by second derivative of magnetization M with respect to an applied magnetic field H becomes zero is set as Hc', and a value of a magnetic field in which magnetization becomes zero in the magnetic field-magnetization curve is set as Hc, a ratio of Hc to Hc' is from 0.6 to 1.0, and Hc' satisfies Expression (II).

$$d^2M/dH^2 \tag{Expression (I)}$$

$$119\ kA/m < Hc' < 2380\ kA/m \tag{Expression (II)}$$

A measurement method of (Hc/Hc') of this specification will be described more specifically.

An intensity of magnetization of the magnetic powder with respect to a magnetic field, to which the magnetic properties of the magnetic powder are applied at a maximum applied magnetic field of 359 kA/m, a temperature of 296 K, and a magnetic field sweeping speed of 1.994 kA/m/s, is measured by using an oscillation sample type magnetic-flux meter (TM-TRVSM5050-SMSL type, manufactured by Tamakawa Co., Ltd.). With the measurement results, a magnetic field (H)-magnetization (M) curve of the magnetic powder is obtained.

A magnetic field in which a value of Expression (I) obtained by second derivative of magnetization M with respect to an applied magnetic field H becomes zero is calculated based on the obtained magnetic field (H)-magnetization (M) curve, and this is defined as Hc'. Hc' satisfies Expression (II).

$$d^2M/dH^2 \tag{Expression (I)}$$

$$119\ kA/m < Hc' < 2380\ kA/m \tag{Expression (II)}$$

The value (Hc') of the magnetic field in which the value of Expression (I) becomes zero is equivalent to a value of a magnetic field in a case where a value (dM/dH) obtained by differentiation of the magnetization M with respect to the applied magnetic field H becomes a maximum.

In addition, in the obtained magnetic field (H)-magnetization (M) curve, the value of the magnetic field H in which the magnetization M becomes zero is defined as Hc. Hc is a value indicating coercivity of magnetic powder which is a measurement target.

A ratio (Hc/Hc') of the value of the magnetic field in which the magnetization becomes zero (Hc) with respect to the value of the magnetic field in which the value of Expression (I) obtained here becomes zero (Hc') is acquired and set as magnetic properties of the magnetic powder.

The operation of the magnetic powder of this disclosure is not clear but is considered as follows.

That is, it is thought that, by setting Hc/Hc' of the magnetic powder of this disclosure to be 0.6 to 1.0, the amount of superparamagnetic components included in the magnetic powder decreases, thereby obtaining magnetic powder having improved magnetic properties.

The superparamagnetic components indicate primary particles having a particle diameter equal to or smaller than 7.5 nm. It is thought that, in a case where the content of iron oxide particles having a primary particle diameter equal to or smaller than 7.5 nm is equal to or greater than a certain amount, a magnetizing force is low, that is, magnetic properties of the magnetic powder are deteriorated due to an effect of particles which are easily subjected to magnetization reversal due to surrounding environment, magnetization is hardly maintained, and thus, signal decay occurs. It is thought that Hc/Hc' set to be 0.6 to 1.0 as described above is one of indexes indicating a small content of fine magnetic powder, and it is thought that, by satisfying the conditions described above, the magnetic properties of the magnetic powder are improved and signal decay is effectively prevented.

The inventors have found that, a value of Hc with respect to Hc' obtained from the magnetic field-magnetization curve (Hc/Hc') is indicates a ratio of a magnetization reversal magnetic field in a case of being affected by superparamagnetic components and a magnetization reversal magnetic field in a case of not being affected by superparamagnetic components, and is a parameter indirectly showing the amount of superparamagnetic components.

That is, as the value of (Hc/Hc') obtained by the method described above is high, a content ratio of superparamagnetic components which are fine particles is small, and thus, signal decay due to the superparamagnetic components is prevented.

The value of (Hc/Hc') is 0.6 to 1.0, preferably 0.7 to 1.0, and more preferably 0.8 to 1.0.

From a viewpoint of achieving the magnetic properties, the content of magnetic powder having a particle diameter equal to or smaller than 7.5 nm with respect to a total content of magnetic powder is preferably 5% by number, more preferably 4% by number, and even more preferably 3% by number.

A particle shape of the specific magnetic powder is not particularly limited and is for example, preferably a sphere shape or a rod shape, and is preferably a sphere shape, from a viewpoint of further improving dispersibility and alignment properties.

Regarding a particle diameter of the specific magnetic powder, an average particle diameter thereof is 8 nm to 25 nm, preferably 8 nm to 20 nm, and more preferably 10 nm to 17 nm.

The specific magnetic powder having the average particle diameter in the range described above can be suitably used in a magnetic recording medium.

The average particle diameter of the specific magnetic powder can be calculated by the following method.

The specific magnetic powder is imaged at a magnification ratio of 50,000 to 80,000 by using a transmission electron microscope (TEM), and printed on photographic printing paper so that the total magnification becomes 500,000, and accordingly, an image of the particles configuring the powder is obtained.

A primary particle is selected from the obtained image of the particles, an outline of the particle is traced with a digitizer, and a diameter (equivalent circle area diameter) of a circle having the same area as the traced region is calculated to measure a size of the particle (primary particle). Here, the primary particle is an independent particle which is not aggregated.

In this specification, the above measurement is performed with respect to 500 randomly extracted particles, and an arithmetical mean of the obtained 500 particle sizes is set as an average particle size of the powder.

As the transmission electron microscope, H-9000 manufactured by Hitachi, Ltd. can be used, for example. In addition, the measurement of the particle size can be performed by using image analysis software KS-400 manufactured by Carl Zeiss, for example. The correction of the scale in a case of performing image capture and image analysis from a scanner can be performed by using a circle having a diameter of 1 cm, for example.

Not only the specific magnetic powder, but also average particle diameters of magnetic powder, non-magnetic particles as an arbitrary component, and the like can be measured by the same method described above.

The content of particles having a particle diameter equal to or smaller than 7.5 nm with respect to a total content of magnetic powder can be obtained, in the same manner as in the measurement of the average particle diameter, by imaging the specific magnetic powder at a magnification ratio of 50,000 to 80,000 by using a transmission electron microscope (TEM), printing the image on photographic printing paper so that the total magnification becomes 500,000, obtaining an image of the particles configuring the powder, randomly selecting and measuring 500 particles in each angle of view of the image, counting the number of particles having a particle diameter equal to or smaller than 7.5 nm in the angle of view, and calculating a percentage thereof with respect to the number of the total particles measured.

Other Components Which Can Be Included in Magnetic Powder

The magnetic powder of this disclosure may further include other components, if necessary, in addition to the magnetic powder of this disclosure.

As the other components, for example, metal powder other than the magnetic powder of this disclosure is used.

As the metal powder other than the magnetic powder of this disclosure, for example, at least one iron oxide-based compound selected from $\alpha$-$Fe_2O_3$ or $\gamma$-$Fe_2O_3$ (hereinafter, may be referred to as other iron oxide-based compound). A total content of at least one iron oxide-based compound selected from $\alpha$-$Fe_2O_3$ or $\gamma$-$Fe_2O_3$ is preferably equal to or smaller than 20 parts by mass with respect to 100 parts by mass of the content of the magnetic powder of this disclosure.

That is, by replacing at least a part of the magnetic powder of this disclosure with the other iron oxide-based compound generally used for magnetic powder, it is possible to adjust magnetic properties and reducing the cost within a range not deteriorating performance.

Meanwhile, the magnetic powder preferably has a single phase, that is, a phase not including metal powder other than the specific magnetic powder, and may include at least one iron oxide-based compound selected from $\alpha$-$Fe_2O_3$ or $\gamma$-$Fe_2O_3$ as inevitable impurities.

In any case, the total content of the other iron oxide-based compound with respect to 100 parts by mass of the content of the magnetic powder of this disclosure is preferably equal to or smaller than 20 parts by mass and more preferably equal to or smaller than 5 parts by mass.

Manufacturing Method of Magnetic Powder

A manufacturing method of magnetic powder of this disclosure is not particularly limited and the magnetic powder can be manufactured by a well-known manufacturing method. In addition, in order to achieve the magnetic properties described above, a well-known method can be applied to a method of removing fine particles.

Among these, as a method of efficiently manufacturing magnetic powder having excellent magnetic properties, the manufacturing method of magnetic powder of this disclosure described below is used.

The manufacturing method of magnetic powder of this disclosure includes:

mixing an aqueous solution of a compound including a trivalent iron ion as a raw material of magnetic powder, with an alkali agent, to obtain a mixed solution I (hereinafter, may be referred to as a step (I));

mixing the mixed solution I with a polyvalent carboxylic acid aqueous solution to obtain a mixed solution II, stirring the mixed solution II, and separating a solid component from the mixed solution II after the stirring (hereinafter, may be referred to as a step (II));

re-dispersing the solid component in a dispersion medium including water, adding an alkali agent, and adding a silyl compound including a hydrolyzable group, to obtain a dispersion liquid (hereinafter, may be referred to as a step (III));

incorporating a component capable of aggregating the solid component by salting out, such as ammonium sulfate, into the dispersion liquid, and separating a generated precipitate, to obtain a magnetic powder precursor (hereinafter, may be referred to as a step (IV));

subjecting the magnetic powder precursor to heat treatment at 800° C. to 1,400° C. (hereinafter, may be referred to as a step (V)); and removing a silicic acid compound in the heat-treated magnetic powder precursor by using an alkali aqueous solution (hereinafter, may be referred to as a step (VI)).

The mixing of the aqueous solution of the compound including a trivalent iron ion with the alkali agent (step (I)) may further include adding at least one selected from polyvinylpyrrolidone or hexadecyltrimethylammonium bromide (step (I-2)).

Step (I)

In this step, an aqueous solution of a compound including a trivalent iron ion as a raw material of magnetic powder is mixed with an alkali agent. The mixing can be performed under the atmosphere, that is, at room temperature and ordinary pressure under the presence of air.

Examples of the compound including a trivalent iron ion include iron (III) nitrate nonahydrate and iron (III) chloride hexahydrate.

The aqueous solution of the compound including a trivalent iron ion can include a metal element other than iron included in the magnetic powder, specifically, a metal compound including at least one metal element selected from the group consisting of Ga, Al, In, Rh, Mn, Co, Ni, Zn, Ti, and Sn in Formula (1-2). Examples of the compound including the metal element other than iron include gallium (III) nitrate octahydrate, cobalt (II) nitrate hexahydrate, titanium (IV) sulfate, aluminum (III) nitrate nonahydrate, indium (III) nitrate trihydrate, rhodium (III) nitrate, cobalt (II) chloride hexahydrate, manganese (II) nitrate hexahydrate, manganese (II) chloride tetrahydrate, nickel (II) nitrate hexahydrate, nickel (II) chloride hexahydrate, zinc (II) nitrate hexahydrate, zinc (II) chloride, and tin (IV) chloride pentahydrate.

A phase of the magnetic powder to be obtained can be adjusted by the content of the compound including the metal element other than iron.

The compound including a trivalent iron ion and the compound including the metal element other than iron included, if desired, are dissolved in water and stirred to prepare an aqueous solution. As the stirring, a well-known method can be used, and for example, stirring using a magnetic stirrer can be performed. The aqueous solution and an alkali agent are mixed with each other in the atmosphere under a temperature condition of 5° C. to 80° C., while continuing stirring. Examples of the alkali agent include an ammonia aqueous solution having a concentration of approximately 20% by mass to 30% by mass, an aqueous solution of an ammonium salt compound, a sodium hydroxide (NaOH) aqueous solution having a concentration of approximately 0.1% by mass to 1.0% by mass, and a potassium hydroxide (KOH) aqueous solution.

In the step (I), at least one compound selected from polyvinylpyrrolidone (PVP) or hexadecyltrimethylammonium bromide may be included in the aqueous solution (step (I-2)), in addition to the compound including a trivalent iron ion and the compound including the metal element other than iron used in combination, if desired. By including the compound described above, particle diameters of the solid particles formed by adding the alkali agent becomes more even.

Step (II)

In the step (II), the mixed solution obtained in the step (I) is mixed with a polyvalent carboxylic acid aqueous solution and stirred, and a solid component is separated after the stirring.

Examples of polyvalent carboxylic acid include citric acid, tartaric acid, and malic acid, and citric acid is preferable, from a viewpoint of causing particle diameters of the obtained particles to be further even.

An amount of polyvalent carboxylic acid used is preferably 0.2 mol to 5.0 mol and more preferably 0.5 mol to 2.5 mol with respect to 1 mol of Fe ions.

The polyvalent carboxylic acid is added to the mixed solution obtained in the step (I) and continuously stirred for 10 minutes to 2 hours, and precipitated solid component is separated after the stirring.

As a method of separating the solid component, a method of performing centrifugal separation is preferably used, from a viewpoint of simplicity of the operation.

The separated solid component is washed with water or the like and dried at 60° C. to 100° C.

In the manufacturing method of the magnetic powder of this disclosure, as a process performed before the step (III) which will be described later, that is, a step of adding and mixing an alkali agent, and adding a silyl compound including a hydrolyzable group to form a magnetic powder precursor, a step (II) of mixing the mixed solution obtained in the step (I) with a polyvalent carboxylic acid aqueous solution, neutralizing the mixed solution, obtaining a solid component, washing and drying the solid component obtained by solid-liquid separation is temporarily.

Through the step (II), the particles having a smaller content of the amorphous component are formed in the formation of the magnetic powder precursor which are subsequently performed, and in a case of firing the magnetic powder precursor, the generation of undesired fine particles caused by the presence of the amorphous component is prevented.

Step (III)

In the step (III), the solid component obtained in the step (II) is dispersed in a dispersion medium including water again, an alkali agent is added, and a silyl compound including a hydrolyzable group is added to obtain a dispersion liquid.

A temperature of the dispersion liquid can be set as 15° C. to 80° C. and may be heated to 30° C. to 80° C.

As the dispersion medium, water is preferable and pure water with a slight amount of impurities, ion exchange water, and the like are more preferable.

As the silyl compound including a hydrolyzable group, tetraethoxysilane (TEOS), trimethoxy silane, and the like are used and TEOS is preferable.

An amount of the silyl compound including a hydrolyzable group used is preferably an amount so that the amount of Si is 0.5 mol to 30 mol and more preferably an amount so that the amount of Si is 2 mol to 15 mol with respect to 1 mol of Fe.

In this step, the precipitate including the magnetic powder precursor is obtained.

Step (IV)

In the step (IV), a component capable of aggregating the solid component by salting out, such as ammonium sulfate, is added to the dispersion liquid obtained in the step (III), the generated precipitate is separated to obtain the magnetic powder precursor.

In the step (IV), a method of mixing by continuously stirring the dispersion liquid obtained in the step (III), while holding the temperature at 15° C. to 80° C., and adding the component capable of aggregating the solid component by salting out dropwise can be used.

As the component capable of aggregating the solid component by salting out, salt having high solubility and a comparatively high valence such as divalence or trivalence, for example, ammonium sulfate or ammonium oxalate is used, and salt can be added dropwise as an aqueous solution.

Slat having high solubility here indicates that 5% by mass or more of salt is dissolved, in a case where salt is added to water at 25° C.

The precipitate formed by mixing the dispersion liquid and the alkali agent is separated, and the magnetic powder precursor can be obtained.

Step (V)

In the step (V), the magnetic powder precursor obtained in the step (IV) is subjected to heat treatment at 800° C. to 1,400° C. The heat treatment can be performed under the atmosphere, that is, in an environment of ordinary pressure under the presence of air.

By performing the heat treatment, magnetism is imparted to the magnetic powder precursor. The heat treatment time is preferably 1 hour to 8 hours.

Step (VI)

In this step, a silicic acid compound in the magnetic powder precursor heat-treated in the step (V) is removed by using an alkali aqueous solution. That is, a silicic acid compound derived from the silyl compound including a hydrolyzable group, remaining in the heat-treated magnetic powder is removed by the alkali aqueous solution.

The magnetic powder obtained by removing the silicic acid compound as impurities is washed with water or the like and dried, and the magnetic powder of this disclosure can be obtained.

Other Steps

The manufacturing method of the magnetic powder of this disclosure may include other steps, in addition to the step (I) to the step (VI).

For example, a step of dispersing the magnetic powder obtained through the step (I) to the step (VI) in an aqueous solution of a water-soluble polymer, performing solid-liquid separation by centrifugal separation, and removing undesired fine particles can be included.

First, by dispersing the magnetic powder in an aqueous solution of a water-soluble polymer, dispersibility of the magnetic particles is further improved, and then, by performing centrifugal separation, classification (that is, removal of undesired fine particles) can be further efficiently performed.

Examples of the water-soluble polymer include polyvinyl alcohol (PVA), hydroxymethyl cellulose (HEC), and polyvinylpyrrolidone (PVP).

As the method of the solid-liquid separation, a method of performing centrifugal separation is preferable, from a viewpoint of ease.

By performing surface treatment by the water-soluble polymer, before the solid-liquid separation, undesired fine particles are efficiently removed and magnetic properties of the specific magnetic powder are further improved.

Magnetic Recording Medium

The magnetic powder of this disclosure described above is suitably used in a magnetic recording medium.

The magnetic recording medium of this disclosure is a magnetic recording medium including a non-magnetic support, and a magnetic layer including magnetic powder of this disclosure described above and provided on the non-magnetic support.

The magnetic recording medium of this disclosure includes a non-magnetic support, and a magnetic layer including magnetic powder and a binding agent on at least one surface of the non-magnetic support. That is, the magnetic recording medium includes a non-magnetic support as a base material and a magnetic layer as a magnetic recording layer, and may include other layers according to the purpose.

The magnetic recording medium of this disclosure includes the magnetic powder of this disclosure having excellent magnetic properties, and thus, a magnetic recording medium having excellent durability and including a magnetic layer having excellent durability in which signal decay, in a case of repeated use for a long period of time, is prevented, is obtained.

Examples of the other layers which can be included in the magnetic recording medium of this disclosure include a non-magnetic layer, a back coating layer, and the like. The other layers will be described later.

Non-Magnetic Support

The non-magnetic support indicates a support not having magnetism. Hereinafter, the non-magnetic support may be simply referred to as a "support".

The expression "not having magnetism" means that at least any of conditions of a residual magnetic flux density equal to or smaller than 10 mT and coercivity equal to or smaller than 7.98 kA/m (100 Oe) is satisfied.

For the non-magnetic support, a base material formed with a material not having magnetism, for example, a material such as a resin material not including a magnetic material or an inorganic material not having magnetism can be used. A material of the non-magnetic support can be suitably selected and used from materials satisfying requirement such as physical properties such as formability necessary for the magnetic recording medium or durability of the formed support.

The support is selected according to the usage aspect of the magnetic recording medium. For example, in a case where the magnetic recording medium is a magnetic tape, a flexible disk, or the like, a resin film having flexibility can be used as the support. In a case where the magnetic recording medium is a hard disk, for example, a resin formed body, an inorganic material formed body, or a metal material formed body which has a disk shape and is harder than the support for a flexible disk, can be used as the support.

Examples of the resin material used for forming the support include a resin material such as polyester such as polyethylene terephthalate (PET) or polyethylene naphthalate (PEN), polyolefin such as polyethylene or polypropylene, an amide-based resin such as aromatic polyamide including polyamide, polyamide imide, or polyaramide, polyimide, cellulose triacetate (TAC), polycarbonate (PC), polysulfone, and polybenzoxazole. The support can be formed by suitably selecting the resin materials described above.

Among these, polyester, the amide-based resin, and the like are preferable, and polyethylene terephthalate, polyethylene naphthalate, and polyamide are more preferable, from viewpoints of excellent strength and durability and ease of processing.

In a case of using the resin material in the support such as a magnetic tape, the resin material is formed to have a film shape. As a method of forming the resin material in a film shape, a well-known method can be used.

The resin film may be an unstretched film or may be a uniaxially stretched film or a biaxially stretched film. For example, in a case of using polyester, a biaxially stretched polyester film can be used, in order to improve dimensional stability.

In addition, a film having a laminated structure of two or more layers can be used according to the purpose. That is, for example, as disclosed in JP1991-224127A (JP-H03-224127A), a support obtained by laminating a film including two different layers can also be used, in order to change surface roughness of a surface on which a magnetic layer is formed and a surface on which a magnetic layer is not formed.

In a case where the magnetic recording medium is a hard disk, a resin formed body obtained by forming the resin material described above in a disk shape, or an inorganic material formed body obtained by forming an inorganic material such as glass or a metal material such as aluminum in a disk shape can be used as the support.

For example, in order to improve adhesiveness with the magnetic layer to be provided on the surface of the support, surface treatment such as corona discharge, plasma treatment, easy bonding treatment, or heat treatment may be performed with respect to the support in advance, if necessary. In addition, in order to prevent foreign materials from mixing into the magnetic layer, surface treatment such as dust protection treatment may be performed with respect to the support.

Each surface treatment described above can be performed by a well-known method.

A thickness of the support is not particularly limited and can be suitably set according to the use of the magnetic recording medium. The thickness of the support is preferably 3.0 µm to 80.0 µm. For example, in a case where the magnetic recording medium is a magnetic tape, the thickness of the support is preferably 3.0 µm to 6.5 µm, more preferably 3.0 µm to 6.0 µm, and even more preferably 4.0 µm to 5.5 µm.

The thicknesses of the non-magnetic support and each layer of the magnetic recording medium which will be described later can be acquired by exposing a cross section of the magnetic recording medium in a thickness direction by a well-known method such as ion beams or a microtome, performing cross section observation regarding the exposed cross section with a scanning electron microscope, and obtaining a thickness of a portion in a thickness direction in the cross section observation or obtaining an arithmetical mean of thicknesses obtained in randomly extracted two or more of plural portions (for example, two portions).

Magnetic Layer

The magnetic layer is a layer contributing to magnetic recording. The magnetic layer is preferably a layer including ferromagnetic powder including the magnetic powder of this disclosure described above and a binding agent which is a film forming component, as a magnetic material, and may further include additives according to the purpose.

Ferromagnetic Powder

The ferromagnetic powder of the magnetic layer includes the magnetic powder of this disclosure.

In a case where the magnetic layer includes the specific magnetic powder of this disclosure, an SNR of the magnetic recording medium is significantly improved as described above.

In a case where the magnetic layer includes ferromagnetic powder other than the magnetic powder of this disclosure (other ferromagnetic powder), a content of the other ferromagnetic powder with respect to 10 parts by mass of the magnetic powder of this disclosure is preferably equal to or smaller than 20 parts by mass.

A measurement method of an average primary particle diameter of the magnetic powder of this disclosure and the other ferromagnetic powder is as described above. The measurement method of an average primary particle diameter of the magnetic powder will be described in detail in the examples which will be described later.

Sample powder of the magnetic powder or the other ferromagnetic powder for measuring the average primary particle diameter may be raw material powder or sample powder collected from the magnetic layer.

As a method of collecting magnetic powder from the magnetic layer as the sample powder, the following method is used, for example.

1. The surface treatment is performed with respect to the surface of the magnetic layer with a plasma reactor manufactured by Yamato Scientific Co., Ltd. for 1 to 2 minutes, and an organic component (binding agent component and the like) on the surface of the magnetic layer is incinerated and removed.

2. A filter paper dipped in an organic solvent such as cyclohexanone or acetone is bonded to an edge part of a metal rod, the surface of the magnetic layer subjected to the treatment of 1. is rubbed thereon, the component of the magnetic layer is peeled off and transferred to the filter paper from the magnetic recording medium.

3. The component of the magnetic layer peeled in 2. is shaken off to fall into an organic solvent such as cyclohexanone or acetone, the organic solvent is dried, and the peeled component is extracted from the filter paper. As the method of shaking, a method of shaking the filter paper off to put into the solvent by an ultrasonic disperser can be used.

4. The component of the magnetic layer scraped off in 3. is put into a sufficiently washed glass test tube, approximately 20 ml of n-butylamine with respect to the amount of the component of the magnetic layer is added into the glass test tube, and the glass test tube is sealed. The amount of n-butylamine capable of decomposing the remaining binding agent without being incinerated is preferably added.

5. The glass test tube is heated at 170° C. for 20 hours or longer, and organic components included in the magnetic layer such as the binder and the curing agent component are decomposed.

6. The precipitate after the decomposition in 5. is sufficiently washed with pure water and dried, and powder is extracted.

With the steps described above, the sample powder can be collected from the magnetic layer and used for the measurement of the average primary particle diameter.

A content (filling percentage) of the ferromagnetic powder in the magnetic layer is preferably 50% to 90% by mass and more preferably 60% to 90% by mass with respect to dry mass of the magnetic layer. The filling percentage of the ferromagnetic powder in the magnetic layer is set to be equal to or greater than 50% by mass with respect to dry mass of the magnetic layer, thereby improving recording density.

The magnetic powder of this disclosure is preferably magnetic powder including a surface-treated layer formed by surface treatment performed with a silane coupling agent in specific conditions. Accordingly, although the particle diameter thereof is smaller than that of general magnetic particles used in the related art, excellent dispersibility is obtained, a filling percentage can be further improved, and recording density is further improved.

Binding Agent

The binding agent is selected from film forming resins which are useful for forming the magnetic layer including the ferromagnetic powder described above.

The resin used for the binding agent is not particularly limited, as long as it can form a resin layer satisfying various physical properties such as desired hardness or durability. The resin can be suitably selected from well-known film forming resins according to the purpose and used as the binding agent.

The resin used for the binding agent may be a homopolymer or a copolymer. The resin used for the binding agent may be a well-known electron beam-curable resin.

As the resin used for the binding agent, a resin selected from polyurethane, polyester, polyamide, a vinyl chloride resin, styrene, acrylonitrile, an acryl resin obtained by (co) polymerization of methyl methacrylate, a cellulose resin such as nitrocellulose, an epoxy resin, a phenoxy resin, a polyvinylalkylal resin such as polyvinyl acetal or polyvinyl butyral can be used. The resin used for the binding agent may be used alone, or the plurality of resins can be used in a mixed manner. Among these, the polyurethane resin, the acryl resin, the cellulose resin, and the vinyl chloride resin are preferable.

In order to further improve dispersibility of the ferromagnetic powder included in the magnetic layer, the resin which is the binder preferably includes a functional group which can be adsorbed to the surface of the powder, for example, a polar group in a molecule. Examples of the preferable functional group which can be included in the resin which is the binding agent include —$SO_3M$, —$SO_4M$, —$PO(OM)_2$, —$OPO(OM)_2$, —COOM, =$NSO_3M$, —$NRSO_3M$, —$NR^1R^2$, and —$N^+R^1R^2R^3X^-$. Here, M represents a hydrogen atom or an alkali metal atom such as Na or K. R represents an alkylene group, R1, R2, and R3 each independently represent a hydrogen atom, an alkyl group, or a hydroxyalkyl group. X represents a halogen atom such as Cl or Br.

In a case where the resin which is the binding agent includes the functional group, the content of the functional group in the resin is preferably 0.01 meq/g to 2.0 meq/g, and more preferably 0.3 meq/g to 1.2 meq/g. It is preferable that the content of functional group in the resin is set to be in the range described above, because dispersibility of the ferromagnetic powder and the like in the magnetic layer is further improved and magnetic flux density is further improved.

Among these, the resin used for the binding agent is more preferably polyurethane including a —$SO_3Na$ group. In a case where polyurethane includes the —$SO_3Na$ group, the content of —$SO_3Na$ group is preferably 0.01 meq/g to 1.0 meq/g with respect to that of polyurethane.

As the binding agent, a commercially available resin can be suitably used.

An average molecular weight of the resin used as the binding agent can be, for example, 10,000 to 200,000 as a weight-average molecular weight.

The weight-average molecular weight in this disclosure is a value obtained by performing polystyrene conversion of a value measured by gel permeation chromatography (GPC). As the measurement conditions, the following conditions can be used.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)
Sample concentration: 0.5% by mass
Sample injection amount: 10 µl
Flow rate: 0.6 ml/min
Measurement temperature: 40° C.
Detector: RI detector The content of the binding agent in the magnetic layer can be 1 part by mass to 30 parts by mass and is preferably 2 parts by mass to 20 parts by mass with respect to 100 parts by mass of the ferromagnetic powder.

Other Additives

The magnetic layer can include various additives, if necessary, in addition to the ferromagnetic powder and the binding agent described above, within a range not negatively affecting the effects of the magnetic layer.

Examples of the additives include an abrasive, a lubricant, a dispersing agent, a dispersing assistant, an antibacterial agent, an antistatic agent, an antioxidant, and carbon black. In addition, as the additives, colloid particles as an inorganic filler, and a curing agent can also be used, if necessary.

As the additive, a commercially available product can be suitably used according to desired properties.

Abrasive

The magnetic layer can include an abrasive. In a case where the magnetic layer includes an abrasive, attached materials which are attached to a head during the usage of the magnetic recording medium can be removed.

As the abrasive, mainly well-known materials having Mohs hardness equal to or greater than 6 such as α-alumina having an α transformation rate equal to or greater than 90%, β-alumina, silicon carbide, chromium oxide, cerium oxide, α-iron oxide, corundum, artificial diamond, silicon nitride, silicon carbide, titanium carbide, titanium oxide, silicon dioxide, and boron nitride are preferably used alone or in combination thereof. In addition, a complex of these abrasives (abrasive subjected to surface treatment with another abrasive) may be used.

A compound or an element other than the metal compound particles which are main components may be included in the abrasive, but there is no change in effect, as long as the content of the main component is equal to or greater than 90% by mass.

In addition, as the abrasive, a material obtained by performing surface treatment of the particles may be used.

As the abrasive, a commercially available product can be suitably used.

Specific examples of the commercially available product of the abrasive include AKP-12, AKP-15, AKP-20, AKP-30, AKP-50, HIT20, HIT-30, HIT-55, HIT60A, HIT70, HIT80, and HIT100 manufactured by Sumitomo Chemical Co., Ltd.; ERC-DBM, HP-DBM, and HPS-DBM manufactured by Reynolds Co., Ltd.; WA10000 manufactured by Fujimi Incorporated; UB20 manufactured by Uyemura & Co., Ltd.; G-5, Kromex U2, and Kromex U1 manufactured by Nippon Chemical Industrial Co., Ltd.; TF100 and TF140 manufactured by Toda Kogyo Corp.; Beta Random Ultrafine manufactured by IBIDEN CO., LTD.; and B-3 manufactured by Showakogyo Co., Ltd.

A particle size of the abrasive is preferably 0.01 µm to 2 µm, more preferably 0.05 µm to 1.0 µm, and even more preferably 0.05 µm to 0.5 µm.

Particularly, in order to increase electromagnetic conversion characteristics, it is preferable that particle size distribution of the abrasive is narrow. In addition, in order to improve durability, the same effect can also be exhibited by combining abrasives having different particle sizes, if necessary, or widening the particle size distribution even with a single abrasive. Regarding the abrasive, a tap density is preferably 0.3 g/ml to 2 g/ml, a water content thereof is preferably 0.1% to 5%, pH thereof is preferably 2 to 11, and a BET specific surface area (SBET) is preferably 1 m2/g to 30 m2/g.

The shape of the abrasive may be any of a needle shape, a sphere shape, or a cube shape, and a particle having a shape including a corner in a part is preferable due to high abrasive properties.

In a case where the magnetic layer includes the abrasive, the content thereof is preferably 1 part by mass to 10 parts by mass with respect to 100 parts by mass of the ferromagnetic powder.

Lubricant

The magnetic layer can include a lubricant.

In a case where the magnetic layer includes the lubricant, running durability of the magnetic recording medium can be improved, for example.

As the lubricant, a well-known hydrocarbon-based lubricant and a fluorine-based lubricant can be used.

As the lubricant, a commercially available product may be suitably used.

As the lubricant, a well-known hydrocarbon-based lubricant, a fluorine-based lubricant, or an extreme pressure additive can be used.

Examples of the hydrocarbon-based lubricant include carboxylic acids such as stearic acid or oleic acid; esters such as butyl stearate; sulfonic acids such as octadecylsulfonic acid; phosphoric acid esters such as monoctadecyl phosphate; alcohols such as stearyl alcohol or oleyl alcohol; carboxylic acid amide such as stearic acid amide; and amines such as stearyl amine.

As the fluorine-based lubricant, a lubricant obtained by substituting a part of or the entire alkyl group of the hydrocarbon-based lubricant with a fluoroalkyl group or a perfluoropolyether group.

Examples of the perfluoropolyether group include a perfluoromethylene oxide polymer, a perfluoroethylene oxide polymer, a perfluoro-n-propylene oxide polymer $(CF_2CF_2CF_2O)_n$, a perfluoroisopropylene oxide polymer $(CF(CF_3)CF_2O)_n$, or a copolymer thereof.

In addition, a compound including a polar functional group such as a hydroxyl group, an ester group, or a carboxyl group at a terminal or in a molecule of the alkyl group of the hydrocarbon-based lubricant is suitable due to a high effect of decreasing a frictional force.

Further, a molecular weight of the lubricant is 500 to 5,000 and preferably 1,000 to 3,000. By setting the molecular weight thereof to be 500 to 5,000, it is possible to prevent volatilization and prevent a deterioration in lubricity. In addition, an increase in viscosity is prevented, and generation of running stop or head crush due to ease of adsorption of a slider and a disk can be prevented.

Specifically, perfluoropolyether which can be used as the lubricant is, for example, commercially available as a product name such as FOMBLIN manufactured by Ausimont or KRYTOX manufactured by DuPont.

Examples of the extreme pressure additive include phosphate esters such as trilauryl phosphate; Phosphite esters such as trilauryl phosphite; thiophosphite esters or thiophosphate esters such as trilauryl trithiophosphite; and a sulfur-based extreme pressure agent such as dibenzyl disulfide.

In a case where the magnetic layer includes the lubricant, the lubricant may be used alone or in combination of two or more kinds thereof.

In a case where the magnetic layer includes the lubricant, the content thereof is preferably 0.1 parts by mass to 5 parts by mass with respect to 100 parts by mass of ferromagnetic powder.

Non-Magnetic Filler

The magnetic layer can include a non-magnetic filler. The non-magnetic filler is preferably colloid particles, from viewpoints of dispersibility and surface roughness.

The colloid particles are preferably inorganic colloid particles or more preferably inorganic oxide colloid particles, from a viewpoint of availability. As the inorganic oxide colloid particles, the colloid particles of the inorganic oxide described above can be used, and complex inorganic oxide colloid particles such as $SiO_2/Al_2O_3$, $SiO_2/B_2O_3$, $TiO_2/CeO_2$, $SnO_2/Sb_2O_3$, $SiO_2/Al_2O_3/TiO_2$, or $TiO_2/CeO_2/SiO_2$ can also be used. Inorganic oxide colloid particles such as $SiO_2$, $Al_2O_3$, $TiO_2$, $ZrO_2$, or $Fe_2O_3$ can be preferably used, and silica colloid particles (colloidal silica) are particularly preferable, from a viewpoint of availability of monodisperse colloid particles.

In a case where the magnetic layer includes the non-magnetic filler, the non-magnetic filler may be used alone or in combination of two or more kinds thereof.

As the non-magnetic filler, a commercially available product can be suitably used.

In a case where the magnetic layer includes the non-magnetic filler, the content thereof is preferably 1 part by mass to 10 parts by mass with respect to 100 parts by mass of ferromagnetic powder.

A thickness of the magnetic layer can be optimized according to a saturation magnetization amount of a magnetic head used, a head gap length, a recording signal band, and the like. The thickness of the magnetic layer is preferably 10 nm to 150 nm, more preferably 20 nm to 120 nm, and even more preferably 30 nm to 100 nm, from a viewpoint of high-density recording.

The magnetic layer may be at least one layer, or the magnetic layer can be separated to two or more layers having magnetic properties, and a configuration regarding a well-known multilayered magnetic layer can be applied. In a case of the multilayered magnetic layer, the thickness of the magnetic layer is a total thickness of the plurality of magnetic layers.

Hereinafter, the non-magnetic layer and the back coating layer which are predetermined layers of the magnetic recording medium will be described.

Non-Magnetic Layer

The non-magnetic layer is a layer contributing to thinning of the magnetic layer. The non-magnetic layer is preferably a layer including non-magnetic powder as a filler and a binding agent which is a film forming component, and may further include additives, if necessary.

The non-magnetic layer can be provided between the non-magnetic support and the magnetic layer. The non-magnetic layer includes a layer not having magnetism, and a substantially non-magnetic layer including a small amount of ferromagnetic powder as impurities or intentionally.

Here, the "non-magnetic" state means that at least any of conditions of a residual magnetic flux density equal to or smaller than 10 mT and coercivity equal to or smaller than 7.98 kA/m (100 Oe) is satisfied, as described in the section of "non-magnetic support".

Non-Magnetic Powder

The non-magnetic powder is powder not having magnetism, which functions as a filler. The non-magnetic powder used in the non-magnetic layer may be inorganic powder or organic powder. In addition, carbon black or the like can also be used. Examples of the inorganic powder include powder of metal, metal oxide, metal carbonate, metal sulfate, metal nitride, metal carbide, and metal sulfide. The non-magnetic powder can be used alone or in combination of two or more kinds thereof. The non-magnetic powder can be purchased as a commercially available product or can be manufactured by a well-known method.

Specifically, titanium oxide such as titanium dioxide, cerium oxide, tin oxide, tungsten oxide, ZnO, $ZrO_2$, $SiO_2$, $Cr_2O_3$, α-alumina having an α transformation rate of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide can be used alone or in combination of two or more kinds thereof. α-iron oxide and titanium oxide are preferable.

The shape of the non-magnetic powder may be any of a needle shape, a sphere shape, a polyhedron shape, and a plate shape. A crystallite size of the non-magnetic powder is preferably 4 nm to 500 nm and more preferably 40 nm to 100 nm. It is preferable that the crystallite size is 4 nm to 500 nm, because suitable surface roughness is obtained without any difficulties regarding dispersion. An average particle diameter of these non-magnetic powders is preferably 5 nm to 500 nm, and the same effect can also be exhibited by combining non-magnetic powders having different average particle diameters, if necessary, or widening the particle size distribution even with a single non-magnetic powder. The average particle diameter of the non-magnetic powder is particularly preferably 10 nm to 200 nm. It is preferable that the average particle diameter of the non-magnetic powder is 5 nm to 500 nm, because dispersion is performed in an excellent manner and suitable surface roughness is obtained.

A content (filling percentage) of the non-magnetic powder in the non-magnetic layer is preferably 50% to 90% by mass and more preferably 60% to 90% by mass.

The "binding agent" and the "additive" of the non-magnetic layer are the same as the "binding agent" and the "additive" described in the section of the "magnetic layer" and the preferable aspects are also the same as the preferable aspects thereof.

A thickness of the non-magnetic layer is preferably 0.05 µm to 3.0 µm, more preferably 0.05 µm to 2.0 µm, and even more preferably 0.05 µm to 1.5 µm.

Back Coating Layer

A back coating layer is a layer contributing to running stability. The back coating layer is preferably a layer including non-magnetic powder as a filler, and a binding agent which is a film forming component, and may further include additives, according to the purpose.

The back coating layer can be provided on a surface of the non-magnetic support on a side opposite to the magnetic layer side.

The "non-magnetic powder" of the back coating layer is the same as the "non-magnetic powder" described in the section of the "non-magnetic layer" and the preferable aspect is also the same as the preferable aspect thereof. In addition, the "binding agent" and the "additive" of the back coating layer are the same as the "binding agent" and the "additive" described in the section of the "magnetic layer" and the preferable aspects are also the same as the preferable aspects thereof.

A thickness of the back coating layer is preferably equal to or smaller than 0.9 µm and more preferably 0.1 µm to 0.7 µm.

Manufacturing Method of Magnetic Recording Medium

A manufacturing method of the magnetic recording medium of this disclosure is not particularly limited, and a well-known manufacturing method can be used.

As the manufacturing method of the magnetic recording medium, a manufacturing method including a step of preparing a magnetic layer forming composition (step (A)), a step of applying the magnetic layer forming composition onto a non-magnetic support to form a magnetic layer forming composition layer (step (B)), a step of performing alignment in magnetic field of the formed magnetic layer forming composition layer (step (c)), and a step of drying the magnetic layer forming composition layer subjected to the alignment in magnetic field to form a magnetic layer (step (D)) is used, for example.

The manufacturing method of the magnetic recording medium can further include a step of performing a calender process of the non-magnetic support including the magnetic layer, and a step of forming any layer such as a non-magnetic layer and a back coating layer.

Each step may be divided into two or more stages.

Step (A)

The manufacturing method of the magnetic recording medium preferably includes the step of preparing a magnetic layer forming composition (step (A)).

The step (A) includes adding and dispersing ferromagnetic powder, a binding agent, and if necessary, additives in a solvent.

All of the raw materials such as the ferromagnetic powder, the binding agent, the non-magnetic powder, and additives of this disclosure may be added in any stage of the step (A).

The raw materials may be added at the same time or may be added in two or more parts. For example, after adding the binding agent in a dispersion step, the binding agent can be further added for viscosity adjustment after the dispersion.

In the dispersion of the raw materials of the magnetic layer forming composition, a well-known dispersion apparatus such as a batch type vertical sand mill or a transverse beads mill can be used, for example. As the dispersion beads, glass beads, zirconia beads, titania beads, and steel beads can be used, for example. A particle diameter (bead diameter) and a filling percentage of the dispersion beads can be optimized and used.

In addition, the dispersion of the raw materials of the magnetic layer forming composition can also be performed by using a well-known ultrasonic device, for example.

Further, at least some raw materials of the magnetic layer forming composition can also be kneaded by using an open kneader, for example, before the dispersion.

Regarding the raw materials of the magnetic layer forming composition, solutions for the raw materials may be respectively prepared and mixed with each other. For example, a magnetic liquid including ferromagnetic powder and an abrasive solution including the abrasive can be respectively prepared, and mixed with each other for dispersion.

Magnetic Layer Forming Composition

The "ferromagnetic powder", the "binding agent", and the "additives" for preparing the magnetic layer forming composition are the same as the "ferromagnetic powder", the "binding agent", and the "additives" described in the section of the "magnetic layer" and the preferable aspects are also the same as the preferable aspects thereof.

A content of the ferromagnetic powder in the magnetic layer forming composition is preferably 5% to 50% by mass and more preferably 10% to 30% by mass, with respect to a total mass of the magnetic layer forming composition.

A content of the binding agent in the magnetic layer forming composition is preferably 1 part by mass to 30 parts by mass and more preferably 2 parts by mass to 20 parts by mass with respect to 100 parts by mass of the ferromagnetic powder.

Solvent

The solvent is a medium for dispersing the ferromagnetic powder, the binding agent, and if necessary, the additives.

One solvent may be used or a mixed solvent of two or more solvents may be used. As the solvent, an organic solvent is preferable.

As the organic solvent, a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methylcyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, or dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N, N-dimethylformamide, hexane, and the like can be used, for example. Preferable examples of the organic solvent include methyl ethyl ketone, cyclohexanone, and a mixed solvent including these at any ratio.

In order to improve dispersibility, a solvent having strong polarity to some extent is preferable, and it is preferable that a content of a solvent having dielectric constant equal to or greater than 15 is equal to or greater than 50% by mass with respect to a total content of the solvent. In addition, a dissolution parameter is preferably 8 to 11.

Curing Agent

The magnetic layer forming composition can include a curing agent.

In a case where the magnetic layer forming composition includes a curing agent, a crosslinked structure is formed in the binding agent included in the magnetic layer, in a case of forming the magnetic layer, thereby further improving film hardness of the magnetic layer to be formed.

As the curing agent, an isocyanate-based compound is preferable. Examples of the isocyanate-based compound include isocyanate-based compounds such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. A product of these isocyanate-based compounds and polyalcohol, and di- or higher valent functional polyisocyanate generated due to condensation of the isocyanate-based compound can be used.

As the curing agent, a commercially available product can be suitably used. Examples of the product name of a commercially available isocyanate-based compound include CORONATE L, CORONATE HL, CORONATE 2030, CORONATE 2031, MILLIONATE MR, and MILLIONATE MTL manufactured by Nippon Polyurethane Industry Co., Ltd., TAKENATE D-102, TAKENATE D-110N, TAKENATE D-200, and TAKENATE D-202 manufactured by Takeda Pharmaceutical Company Limited, DESMODUR L, DESMODUR IL, DESMODUR N, and DESMODUR HL manufactured by Sumitomo Bayer Co., Ltd.

In a case where the magnetic layer forming composition includes the curing agent, the curing agent may be used alone or in combination of two or more kinds thereof.

In a case where the magnetic layer forming composition includes the curing agent, a content of the curing agent may be, for example, 0.1 parts by mass to 10 parts by mass with respect to 100.0 parts by mass of the ferromagnetic powder, and can be preferably 1 part by mass to 10 parts by mass, from a viewpoint of improving hardness of the magnetic layer.

If necessary, the curing agent can be included in a forming composition for another layer, in order to improve film hardness of the other layer, in a case of forming the other layer.

Step (B)

The manufacturing method of the magnetic recording medium of this disclosure preferably includes a step of applying the magnetic layer forming composition onto the non-magnetic support to form a magnetic layer forming composition layer (step (B)), after the composition preparation step.

The step (B) can be performed, for example, by applying the amount of magnetic layer forming composition onto the running non-magnetic support so as to obtain a predetermined film thickness. The preferable film thickness of the magnetic layer is as described in the section of the "magnetic layer".

As a coating method of applying the magnetic layer forming composition onto a surface of the support, a well-known method such as air doctor coating, blade coating, rod coating, extrusion coating, air knife coating, squeeze coating, impregnation coating, reverse roll coating, transfer roll coating, gravure coating, kiss coating, cast coating, spray coating, spin coating can be used. Regarding the coating method, "Latest coating technologies" published by Sogo Gijutsu Center (31 May 1983) can be referred to, for example.

Step (C)

The manufacturing method of the magnetic recording medium of this disclosure preferably includes a step of performing alignment in magnetic field of the formed magnetic layer forming composition layer (step (C)), after the composition layer formation step.

In a case where the support has a film shape such as a magnetic tape, alignment in magnetic field of the formed magnetic layer forming composition layer can be performed with respect to the ferromagnetic powder included in the magnetic layer forming composition by using cobalt magnets or solenoid. In a case where the support is a support for a hard disk, isotropic orientation is sufficiently obtained without performing an alignment process without using an alignment device. A well-known random alignment device is preferably used by obliquely alternately disposing cobalt magnets or applying an alternating magnetic field by solenoid. In addition, isotropic magnetic properties can also be applied in a circumferential direction by performing homeotropic alignment by using a well-known method such as a method using a polar opposing magnet. Particularly, in a case of performing high-density recording, homeotropic alignment is preferable. In addition, circumferential alignment can also be performed by using a spin coating.

The alignment in magnetic field is preferably performed before drying the formed magnetic layer forming composition layer.

The alignment in magnetic field can be performed by a homeotropic alignment process of applying a magnetic field having magnetic field strength of 0.1 T to 1.0 T in a vertical direction to the surface of the formed magnetic layer forming composition layer.

Step (D)

The manufacturing method of the magnetic recording medium of this disclosure preferably includes a step of drying the magnetic layer forming composition layer subjected to the alignment in magnetic field to form a magnetic layer (step (D)), after the step (C) of performing the alignment in magnetic field.

In the drying of the magnetic layer forming composition layer, it is possible to control the drying of the magnetic layer forming composition layer by controlling a temperature of dry air, an air flow, or an application speed. For example, the application speed is preferably 20 m/min to 1,000 m/min and a temperature of the dry air is preferably equal to or higher than 60° C. In addition, preliminary drying of the composition can be suitably performed before applying a magnetic field.

Calender Process Step

In the manufacturing method of the magnetic recording medium of this disclosure, after the magnetic layer is formed on the support through the step (A), the step (B), the step (C), and the step (D), a step of performing a calender process with respect to the non-magnetic support including the magnetic layer is preferably performed.

The non-magnetic support including the magnetic layer is temporarily wound with a winding roll, unwound from the winding roll, and supplied for the calender process. By performing the calender process, surface smoothness is improved, and a filling percentage of the ferromagnetic powder in the magnetic layer is improved due to disappearance of holes generated due to removal of the solvent at the time of drying. Accordingly, it is possible to obtain a magnetic recording medium having higher electromagnetic conversion characteristics. The calender process is preferably performed while changing calender process conditions according to smoothness of the surface of the magnetic layer.

In the calender process, a super calender roll or the like can be used, for example.

As a calender roll, a heat resistant plastic roll such as epoxy, polyimide, polyamide, or polyamideimide can be used. In addition, the process can also be performed by a metal roll.

As the calender process conditions, a temperature of the calender roll can be, for example, 60° C. to 120° C. and can be preferably set as 80° C. to 100° C., and pressure can be, for example, 100 kg/cm to 500 kg/cm (98 kN/m to 490 kN/m) and can be preferably set as 200 kg/cm to 450 kg/cm (196 kN/m to 441 kN/m).

Step of Forming any Layer Such as Non-Magnetic Layer and Back Coating Layer

The manufacturing method of the magnetic recording medium of this disclosure can include a step of forming any layer such as the non-magnetic layer and the back coating layer.

The non-magnetic layer and the back coating layer can be formed by performing the same steps as the step (B), the step (C), and the step (D) for forming the magnetic layer, after preparing the composition for forming each layer.

As described in the sections of the "non-magnetic layer" and the "back coating layer", the non-magnetic layer can be provided between the support and the magnetic layer, and the back coating layer can be provided on a surface of the support on a side opposite to the side provided with the magnetic layer.

A forming composition of the non-magnetic layer and a forming composition of the back coating layer can be prepared with components and the contents described in the sections of the "non-magnetic layer" and the "back coating layer".

EXAMPLES

Hereinafter, the magnetic powder, the manufacturing method thereof, and the magnetic recording medium of this disclosure will be described more specifically with reference to examples, but this disclosure is not limited to the following specific examples, and various modifications can be performed as long as those are not departed from the gist of the invention.

"%" and "parts" in the examples are based on mass, unless otherwise noted.

Example 1

4.0 g of ammonia aqueous solution having a concentration of 25% by mass was added to a solution obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinylpyrrolidone (PVP) in 90 g of pure water, while stirring by using a magnetic stirrer, in an atmosphere under the conditions of 25° C., and this solution was stirred for 2 hours under the condition of a temperature of 25° C. (step (I)). A citric acid solution obtained by dissolving 1 g of citric acid to 9 g of pure water was added to the obtained solution and stirred for 1 hour (step (II)). Powder precipitated after the stirring was collected by centrifugal separation, washed with pure water, and dried at 80° C.

800 g of pure water was added to the dried powder, the powder is dispersed in water again, and a dispersion liquid was obtained. The obtained dispersion liquid was heated to 50° C. and 40 g of a 25% by mass ammonia aqueous solution was added dropwise while stirring. After stirring the solution while maintaining a temperature at 50° C. for 1 hour, 14 mL of tetraethoxysilane (TEOS) was added dropwise, and stirred for 24 hours (step (III)). 50 g of ammonium sulfate was added to the obtained reaction solution, the precipitated powder was collected by centrifugal separation, washed with pure water, and dried at 80° C. for 24 hours, thereby obtaining a magnetic powder precursor (step (IV)).

A furnace is filled with the obtained magnetic powder precursor and the precursor was subjected to heat treatment at 1,030° C. in the atmosphere for 4 hours (step (V)).

The heat-treated magnetic powder precursor was put into a sodium hydroxide (NaOH) aqueous solution having a concentration of 4 mol/L and stirred at a liquid temperature of 70° C. for 24 hours, to remove a silicic acid compound which is impurities from the heat-treated magnetic powder precursor (step (VI)).

Then, the magnetic powder, from which the silicic acid compound was removed, is collected by performing centrifugal separation treatment and washed with pure water, thereby obtaining iron oxide magnetic nano-particles having a single phase of an $\varepsilon$-$Fe_2O_3$ phase (specific magnetic powder).

The composition of the obtained magnetic powder of Example 1 was confirmed by high-frequency inductively coupled plasma emission spectral analysis (ICP-OES), and the composition was $\varepsilon$-$Ga_{0.24}Co_{0.05}Ti_{0.05}Fe_{1.66}O_3$. In addition, by confirming a peak of an X-ray diffraction (XRD) pattern of the powder, it was confirmed that the magnetic powder is magnetic powder having a $\varepsilon$-$Fe_2O_3$ single phase not including at least one iron oxide-based compound selected from $\alpha$-$Fe_2O_3$ or $\gamma$-$Fe_2O_3$.

As an ICP-OES measurement device, ICPS-8100 manufactured by Shimadzu Corporation was used.

The measurement was performed by the following method.

A vessel (beaker) containing 12 mg of the sample powder and 10 mL of hydrochloric acid having a concentration of 4 mol/L was held on a hot plate at a set temperature of 80° C. for 3 hours, and a solution was obtained.

30 mL of pure water was added to the obtained solution, and the solution was filtered by using a membrane filter having a hole diameter of 0.1 μm.

The obtained filtrate was analyzed by the ICP-OES measurement device, and a content of each metal atom was obtained.

As the powder X-ray diffraction (XRD) device, X'Pert Pro manufactured by PANalytical was used, and the measurement was performed under the following measurement conditions.

X-ray source: Cu Kα ray (wavelength of 1.54 Å (0.154 nm)), (output: 40 mA, 45 kV)

Scanned range: 20°<2θ<70°

Scan interval: 0.05°

Scan speed: 0.75°/min

The observation was performed by a method which will be described later, and the shape of the magnetic powder was a sphere shape. An average particle diameter calculated by a method which will be described later was 13.5 nm.

In addition, the confirmation was performed by the method described above, a content of particles having a particle diameter of 7.5 nm in the entire magnetic powder was 3.9% by number.

Calculation of Average Particle Diameter of Metal Powder and Magnetic Powder

The powder such as the magnetic powder was imaged at a magnification ratio of 80,000 by using a transmission electron microscope (TEM: manufactured by Hitachi, Ltd., transmission electron microscope H-9000) the image was printed on photographic printing paper so that the total magnification becomes 500,000, and an image of the particles configuring the powder was obtained.

A primary particle was selected from the obtained image of the particles, an outline of the particle was traced with a digitizer, and a size of the particle (primary particle) was measured. Here, the primary particle is an independent particle which is not aggregated. The particle size was measured by tracing an outline of each particle with a digitizer and calculating a diameter (equivalent circle area diameter) of a circle having the same area as the traced region. The measurement was performed by using image analysis software KS-400 manufactured by Carl Zeiss, as image analysis software.

The above measurement was performed regarding randomly extracted 500 particles.

An arithmetical mean of the 500 particle sizes obtained as described above was set as an average particle size of the powder. The results are shown in Table 1.

Evaluation of Magnetic Properties

The magnetic properties of the magnetic powder were evaluated by the following method.

An intensity of magnetization of the magnetic powder with respect to a magnetic field, to which magnetization was applied at a maximum applied magnetic field of 4.5 kOe (kilooersted: 354 kA/m), a temperature of 296 K, and a magnetic field sweeping speed of 250 e/s (1.994 kA/m/s), was measured by using an oscillation sample type magnetic-flux meter (TM-TRVSM5050-SMSL type, manufactured by Tamakawa Co., Ltd.). With the measurement results, a magnetic field (H)-magnetization (M) curve of the magnetic powder is obtained.

In the obtained magnetic field (H)-magnetization (M) curve, a magnetic field in which a value of Expression (I) obtained by second derivative with a magnetic field in which magnetization is applied, becomes zero was calculated and this was defined as Hc'.

$$d^2M/dH^2 \quad \text{Expression (I)}$$

Here, 119 kA/m<Hc'<2380 kA/m

The value (Hc') of the magnetic field in which the value of Expression (I) becomes zero is equivalent to a value of a magnetic field in a case where a value (dM/dH) obtained by differentiation with the magnetic field, to which the magnetization is applied, becomes a maximum.

In addition, in the obtained magnetic field (H)-magnetization (M) curve, the value of the magnetic field in which the magnetization becomes zero was defined as Hc. Hc is a value indicating coercivity of magnetic powder which is a measurement target.

A ratio (Hc/Hc') of the value of the magnetic field in which the magnetization becomes zero (Hc) with respect to the value of the magnetic field in which the value of Expression (I) obtained here becomes zero (Hc') was acquired, and was set as an index of the magnetic properties of the obtained magnetic powder.

The magnetic powder in which the magnetic properties (Hc/Hc') is 0.6 to 1.0 and Hc' is greater than 119 kA/m and smaller than 2,380 kA/m is the magnetic powder of this disclosure.

Example 2 to Example 6

Magnetic powder of Examples 2 to Example 6 are manufactured in the same manner as in Example 1, except that a temperature in a case of adding PVP or adding the ammonia aqueous solution before adding a citric acid aqueous solution added in a case of manufacturing the magnetic powder precursor, in the manufacturing of the magnetic powder of Example 1, was changed to the conditions shown in Table 1, and the evaluation was performed in the same manner as in Example 1.

Example 7

1 g of the magnetic powder obtained in Example 1 was added to 30 g of a 5% by mass aqueous solution of polyvinyl alcohol (PVA: average degree of polymerization: 500, complete saponification type, manufactured by Wako Pure Chemical Industries, Ltd.). Zirconia (Zr) beads having a diameter of 100 μm was added to the obtained solution, and shaken with a shaker at room temperature (25° C.) for 6 hours, and accordingly, the magnetic powder was sufficiently dispersed in the PVA aqueous solution described above. The obtained dispersion liquid was treated with a centrifugal separator at a centrifugal force of 200,000 G (1,961,330 m/s$^2$) for 45 minutes. The precipitate precipitated by the centrifugal separation was washed with pure water and dried at 80° C. for 24 hours, to obtain magnetic powder of Example 7, and the evaluation was performed in the same manner as in Example 1.

Example 8

Magnetic powder of Example 8 was obtained in the same manner as in Example 7, except that the conditions of the centrifugal separation were changed to a centrifugal force of 1,961,330 m/s$^2$ for 30 minutes, and the evaluation was performed in the same manner as in Example 1.

Example 9

Magnetic powder of Example 9 was obtained in the same manner as in Example 7, except that the conditions of the centrifugal separation were changed to a centrifugal force of 1,961,330 m/s$^2$ for 20 minutes, and the evaluation was performed in the same manner as in Example 1.

Comparative Example 1

4.0 g of ammonia aqueous solution having a concentration of 25% was added to a solution obtained by dissolving 8.3 g of iron (III) nitrate nonahydrate, 1.3 g of gallium (III) nitrate octahydrate, 190 mg of cobalt (II) nitrate hexahydrate, and 150 mg of titanium (IV) sulfate in 90 g of pure water, while stirring by using a magnetic stirrer, in an atmosphere under the conditions of 40° C., and this solution was stirred for 2 hours while maintaining the temperature at 40° C. In addition, a solution obtained by dissolving 480 mg of citric acid in 4.5 g of water was added to the mixed solution, and 5.7 g of 10% ammonia aqueous solution was added and stirred for 1 hour.

The obtained dispersion liquid was ultrafiltered with an ultrafiltration film (cutoff molecular weight: 50,000) until electrical conductivity of the filtrate become equal to or smaller than s50 mS/m.

The amount of water, so that a total amount becomes 120 mL, was added to the liquid obtained by ultrafiltration, and 6.5 g of 25% ammonia was added thereto while stirring at 30° C. Further, 16 mL of TEOS was added and continuously stirred for 24 hours while maintaining the temperature at 30° C.

After that, a solution obtained by dissolving 3 g of ammonium sulfate in 4.5 mL of pure water was added. The precipitated powder was collected by centrifugal separation, washed with pure water, and dried at 80° C. for 24 hours, thereby obtaining a magnetic powder precursor. Magnetic powder of Comparative Example 1 was obtained in the same manner as in Example 1, except that the obtained magnetic powder precursor was used, and the evaluation was performed in the same manner as in Example 1.

In a case where the composition of the obtained magnetic powder of Comparative Example 1 was confirmed in the same manner as in Example 1, the shape of the magnetic powder was a sphere shape and the composition was $\varepsilon$-$Ga_{0.24}Co_{0.05}Ti_{0.05}Fe_{1.66}O_3$.

Comparative Example 2

4.0 g of an ammonia aqueous solution having a concentration of 25% was added to a solution obtained by dissolving 5.5 g of iron (III) chloride nonahydrate, 1.3 g of gallium (III) nitrate octahydrate, 155 mg of cobalt (II) nitrate hexahydrate, and 120 mg of titanium (IV) sulfate in 90 g of pure water while stirring by using a magnetic stirrer, in an atmosphere under the conditions of 10° C., and this solution was stirred for 2 hours while maintaining the temperature at 10° C.

In addition, a solution obtained by dissolving 480 mg of citric acid in 4.5 g of water was added, and 5.7 g of 10% ammonia aqueous solution was added and stirred for 1 hour. The obtained solution was ultrafiltered with an ultrafiltration film (cutoff molecular weight: 50,000) until electrical conductivity of the filtrate become equal to or smaller than s50 mS/m. Then, the obtained slurry was subjected to heat treatment with an autoclave at 160° C. for 6 hours.

The amount of water, so that a total amount becomes 120 mL, was added to the slurry after the heat treatment, and 6.5 g of 25% ammonia was added while stirring at 30° C. Further, 16 mL of TEOS was added and continuously stirred for 24 hours while maintaining the temperature at 30° C.

After that, a solution obtained by dissolving 3 g of ammonium sulfate in 4.5 mL of pure water was added. The precipitated powder was collected by centrifugal separation, washed with pure water, and dried at 80° C. for 24 hours, thereby obtaining a magnetic powder precursor. Magnetic powder of Comparative Example 2 was obtained in the same manner as in Example 1, except that the obtained magnetic powder precursor was used, and the evaluation was performed in the same manner as in Example 1.

In a case where the composition of the obtained magnetic powder of Comparative Example 2 was confirmed in the same manner as in Example 1, the shape of the magnetic powder was a sphere shape and the composition was $\varepsilon$-$Ga_{0.24}Co_{0.05}Ti_{0.05}Fe_{1.66}O_3$.

Manufacturing of Magnetic Recording Medium
List of Magnetic Liquid
$\varepsilon$-$Fe_2O_3$ powder (magnetic powder of the examples and comparative examples described above): 100.0 parts
Oleic acid: 2.0 parts
A vinyl chloride copolymer: (manufactured by Zeon Corporation, MR-104): (amount shown in Table 1)
$SO_3Na$ group-containing polyurethane resin: (amount shown in Table 1)
(Weight-average molecular weight: 70,000, $SO_3Na$ group amount: 0.07 meq/g)
An amine-based polymer: (amount shown in Table 1)
(DISPERBYK-102 manufactured by BYK Additives & Instruments)
Methyl ethyl ketone (solvent): 150.0 parts
Cyclohexanone: 150.0 parts
List of Abrasive Solution
$\alpha$-alumina: 6.0 parts
(BET specific surface area of 19 m2/g, Mohs hardness of 9) $SO_3Na$ group-containing polyurethane resin: 0.6 parts
(Weight-average molecular weight: 70,000, $SO_3Na$ group: 0.1 meq/g) 2,3-dihydroxynaphthalene: 0.6 parts
Cyclohexanone: 23.0 parts
List of Non-Magnetic Filler Solution
Colloidal silica: 2.0 parts
(Average particle size of 120 nm)
Methyl ethyl ketone: 8.0 parts
List of Lubricant and Curing Agent Solution
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Nippon Polyurethane Industry Co., Ltd.): 3.0 parts 1. Preparation of Magnetic Layer Forming Composition The magnetic layer forming composition was prepared by the following method.

Various components shown in the list of the magnetic liquid were dispersed with a batch type vertical sand mill by using zirconia beads having a bead diameter of 0.5 mm$\phi$ (first dispersion beads, density of 6.0 g/cm$^3$) for 24 hours (first step). Then, filtering was performed by using a filter having an average hole diameter of 0.5 μm and a dispersion liquid A was prepared. The amount of zirconia beads which was 10 times of that of magnetic powder including $\varepsilon$-$Fe_2O_3$ based on mass was used.

After that, the obtained dispersion liquid A was dispersed with a batch type vertical sand mill by using diamond beads having a bead diameter of 500 nm$\phi$ (second dispersion beads, density of 3.5 g/cm$^3$) for 1 hour, and a dispersion liquid (dispersion liquid B), from which the diamond beads were separated by using a centrifugal separator, was prepared and was set as magnetic liquid.

In regards to the abrasive solution, various components shown in the list of the abrasive solution were mixed with each other, zirconia beads having a bead diameter of 0.3 mm$\phi$ was added thereto, the mixture was put into a transverse beads mill disperser, a value of bead volume/(volume of abrasive solution+bead volume) was adjusted to be 80%, a beads mill dispersion process was performed for 120 minutes, the processed liquid was extracted, and an ultrasonic dispersion filtering process was performed by using a flow type ultrasonic dispersion filtering device. By doing so, an abrasive solution was prepared.

The prepared magnetic liquid, the abrasive solution, the non-magnetic filler solution, and the lubricant and curing agent solution were introduced into a dissolver stirrer, stirred at a circumferential speed of 10 m/sec for 30 minutes, subjected to a process of 3 passes with a flow type ultrasonic disperser at a flow rate of 7.5 kg/min, and filtered with a filter having a hole diameter of 1 μm, thereby preparing a magnetic layer forming composition.

List of Non-Magnetic Layer Forming Composition
Non-magnetic inorganic powder α-iron oxide: 100.0 parts
(Average particle size: 10 nm, BET specific surface area: 75 m$^2$/g)
Carbon black: 25.0 parts
(Average particle size: 20 nm)
$SO_3Na$ group-containing polyurethane resin: 18.0 parts
(Weight-average molecular weight: 70,000, $SO_3Na$ group amount: 0.2 meq/g)
Stearic acid: 1.0 part
Cyclohexanone: 300.0 parts
Methyl ethyl ketone: 300.0 parts 2. Preparation of Non-Magnetic Layer Forming Composition Each component shown in the list of the non-magnetic layer forming composition was dispersed with a batch type vertical sand mill by using zirconia beads having a bead diameter of 0.1 mmφ for 24 hours, and filtered by using a filter having an average hole diameter of 0.5 μm, thereby preparing a magnetic layer forming composition.

List of Back Coating Layer Forming Composition
Non-magnetic inorganic powder α-iron oxide: 80.0 parts
(Average particle size: 0.15 μm, BET specific surface area: 52 m$^2$/g)
Carbon black: 20.0 parts
(Average particle size: 20 nm)
A vinyl chloride copolymer: 13.0 parts
A sulfonic acid salt group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts 3. Preparation of Back Coating Layer Forming Composition Among the components shown in the list of the back coating layer forming composition, the components excluding the lubricant (stearic acid and butyl stearate), polyisocyanate, and 200.0 parts of cyclohexanone were kneaded by an open kneader and diluted, and was subjected to a dispersion process of 12 passes, with a transverse beads mill disperser and zirconia beads having a bead diameter of 1 mmφ, by setting a bead filling percentage as 80 volume %, a circumferential speed of rotor distal end as 10 m/sec, and a retention time for 1 pass as 2 minutes.

After that, the remaining components were added and stirred with a dissolver, the dispersion liquid was filtered with a filter having an average hole diameter of 1 μm, and a back coating layer forming composition was prepared.

4. Manufacturing of Magnetic Tape

The non-magnetic layer forming composition prepared as described above was applied onto a surface of a support made of polyethylene naphthalate having a thickness of 5.0 μm (non-magnetic support) with the amount so that a thickness after drying becomes 100 nm, and dried, thereby forming a non-magnetic layer.

The magnetic layer forming composition prepared as described above was applied onto a surface of the formed non-magnetic layer with the amount so that a thickness after drying becomes 70 nm, and accordingly, a coating layer was formed.

A homeotropic alignment process of applying a magnetic field having a magnetic field strength of 0.15 T in a vertical direction with respect to a surface of the coating layer of the magnetic layer forming composition, while the formed coating layer of the magnetic layer forming composition is wet (not dried).

Then, the coating layer of the magnetic layer forming composition subjected to the homeotropic alignment process was dried and a magnetic layer was formed.

The amount of back coating layer forming composition prepared as described above was applied to the surface of the non-magnetic support opposite to the surface, where the non-magnetic layer and the magnetic layer were formed, so that a thickness after the drying becomes 0.4 μm and dried, thereby obtaining a laminate.

A calender process (surface smoothing treatment) was performed with respect to the laminate including the non-magnetic layer and the magnetic layer on one surface of the non-magnetic support and the back coating layer on a surface of the non-magnetic support opposite to the side provided with the magnetic layer by a pair of calender rolls configured of only a metal roll, at a speed of 100 m/min, linear pressure of 300 kg/cm (294 kN/m), and a surface temperature of a calender roll of 100° C., and then, the heat treatment was performed in the environment of the atmosphere temperature of 70° C. for 36 hours.

The heat-treated laminate was slit to have a width of ½ inches (0.0127 m) and a magnetic tape as a magnetic recording medium was obtained.

Evaluation of Magnetic Recording Medium

Regarding the magnetic tape as the obtained magnetic recording medium, the evaluation of signal decay in a case of repeated reproducing was performed by the following method.

Evaluation Signal Decay

In this evaluation, as signal decay, a decrease in reproducing output in a case where the magnetic recording medium, on which a signal is recorded, is repeatedly reproduced, that is, a reproducing output decay rate was evaluated. A small numerical value of the decay rate shows that output decay in a case of the reproducing is prevented.

A recording head (metal-in-gap (MIG), gap length of 0.15 μm, track width of 1.8 μm) and a giant-magnetoresistive (GMR) head for reproducing (reproducing track width of 1 μm) were attached to a loop tester and set as a reproducing device.

A signal having a linear recording density of 200 kfci was recorded on each magnetic tape of the examples and the comparative examples, then, the recording signal was repeatedly reproduced with the reproducing device described above, and the decay rate of reproducing output with respect to time immediately after the recording to the reproducing was measured. The results are shown in Table 1. The decay of the reproducing output which is smaller than a detection lower limit (−0.5%/decade) was shown as "<−0.5%".

TABLE 1

| | Preparation conditions of magnetic powder | | | | Physical properties of magnetic powder | | | | | |
|---|---|---|---|---|---|---|---|---|---|---|
| | Temperature of mixed solution | additive | Removal process of unnecessary ions for magnetic powder precursor | Centrifugal separation processing time after post-processing | Average particle diameter of magnetic powder (nm) | Hc (kA/m) | Hc' (kA/m) | Hc/Hc' | Content of particles having particle diameter equal to or smaller than 7.5 mm (number %) | Performance evaluation Reproducing output decay rate (%/decade) |
| Example 1 | 25° C. | PVP | Centrifugal separation (pre-processing) | — | 13.7 | 219 | 307 | 0.71 | 3.9 | −1.0 |
| Example 2 | 25° C. | None | Centrifugal separation (pre-processing) | — | 13.8 | 214 | 311 | 0.69 | 4.2 | −1.2 |
| Example 3 | 25° C. | CTAOH | Centrifugal separation (pre-processing) | — | 13.7 | 217 | 310 | 0.70 | 4.0 | −1.1 |
| Example 4 | 4° C. | PVP | Centrifugal separation (pre-processing) | — | 13.6 | 236 | 311 | 0.76 | 3.6 | −0.8 |
| Example 5 | 40° C. | PVP | Centrifugal separation (pre-processing) | — | 13.6 | 213 | 315 | 0.68 | 4.2 | −1.1 |
| Example 6 | 60° C. | PVP | Centrifugal separation (pre-processing) | — | 13.5 | 187 | 305 | 0.61 | 4.4 | −1.3 |
| Example 7 | 25° C. | PVP | Centrifugal separation (pre-processing) | 45 minutes | 15.5 | 252 | 325 | 0.78 | 3.1 | −0.8 |
| Example 8 | 25° C. | PVP | Centrifugal separation (pre-processing) | 30 minutes | 16.4 | 269 | 333 | 0.81 | 1.6 | <−0.5 |
| Example 9 | 25° C. | PVP | Centrifugal separation (pre-processing) | 20 minutes | 17.6 | 310 | 347 | 0.89 | 0.5 | <−0.5 |
| Comparative Example 1 | 40° C. | None | Ultrafiltration (post-processing) | — | 13.5 | 166 | 311 | 0.53 | 5.8 | −2.4 |
| Comparative Example 2 | 10° C. | None | Ultrafiltration (post-processing) | — | 13.4 | 179 | 309 | 0.58 | 5.6 | −2.2 |

In Table 1, the "temperature of the mixed solution" shows a temperature of the mixed solution in a case where the ammonia aqueous solution was mixed in the step (I), and the "additive" shows the name of the additive compound included in the step (I).

The "centrifugal separation treatment time after post-treatment" shows centrifugal separation treatment time of the solid-liquid separation after the magnetic powder of Example 1 was dispersed in the PVA aqueous solution.

PVP in Table 1 is polyvinylpyrrolidone described above and CTAOH is hexadecyltrimethylammonium bromide.

With the evaluation results shown in Table 1, it is found that, regarding all of magnetic tape using the magnetic powder of Example 1 to Example 9 in which Hc/Hc' is in a range regulated in this disclosure, the reproducing output decay rate is great and excellent durability is obtained. In addition, from the comparison between Example 1 and Examples 7 to 9, it is found that, regarding the magnetic powder to which polyvinyl alcohol was added and dispersed again after forming the magnetic powder, Hc/Hc' further increases, the reproducing output decay rate further increases, and durability is further improved.

On the other hand, it is found that, regarding the magnetic powder of Comparative Example 1 and Comparative Example 2, in which polyvalent carboxylic acid was added as pre-treatment for forming particles under the alkali conditions, the treatment of centrifugal separation is not performed, and a process of removing ions as impurities by ultrafiltration after forming particles (magnetic powder precursor) under alkali conditions was performed, the value of Hc/Hc' is small, the reproducing output decay rate of the magnetic tape obtained by using the magnetic powder further decreases, and durability is lower than that of magnetic tape using the magnetic powder of the examples.

It is thought that, by performing the pre-treatment of the manufacturing method of the magnetic powder of this disclosure, the amorphous component is removed before the magnetic powder precursor is formed, the generation of undesired fine particles caused by the amorphous component is further prevented, compared to a method of performing the process of removing impurities after forming the magnetic powder precursor.

What is claimed is:

1. Magnetic powder comprising:
    at least one epsilon-phase iron oxide-based compound selected from the group consisting of $\varepsilon\text{-}Fe_2O_3$ and a compound represented by Formula (1),
    wherein the magnetic powder has an average particle diameter of 8 nm to 25 nm, a ratio of Hc to Hc' is from 0.6 to 1.0, and Hc' satisfies Expression (II),
    wherein Hc' represents a magnetic field at which a value of Expression (I) indicating a second derivative of magnetization M with respect to an applied magnetic field H becomes zero in a magnetic field-magnetization curve obtained by performing measurement at a maximum applied magnetic field of 359 kA/m, a temperature of 296 K, and a magnetic field sweeping speed of 1.994 kA/m/s, and Hc represents a magnetic field at which magnetization becomes zero in the magnetic field-magnetization curve;

$$d^2M/dH^2 \qquad \text{Expression (I)}$$

$$119 \text{ kA/m} < Hc' < 2380 \text{ kA/m} \qquad \text{Expression (II)}$$

$$\varepsilon\text{-}A_a Fe_{2-a} O_3 \qquad (1)$$

wherein, in Formula (1), A represents at least one metal element other than Fe, and a represents a number that satisfies a relationship of 0<a<2, and wherein a content of magnetic powder having a particle diameter equal to or smaller than 7.5 nm with respect to a total content of magnetic powder is equal to or smaller than 5% by number.

2. The magnetic powder according to claim 1, wherein the compound represented by Formula (1) is a compound represented by Formula (1-2), $$\varepsilon\text{-}A^1_x A^2_y A^3_z Fe_{(2-x-y-z)}O_3 \qquad (1\text{-}2)$$

wherein, in Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, $A^3$ represents at least one tetravalent metal element selected from the group consisting of Ti and Sn, x represents a number that satisfies a relationship of $0<x<1$, y represents a number that satisfies a relationship of $0<y<1$, z represents a number that satisfies a relationship of $0<z<1$, and $x+y+z<2$.

3. The magnetic powder according to claim 1, wherein a total content of at least one iron oxide-based compound selected from $\alpha\text{-}Fe_2O_3$ or $\gamma\text{-}Fe_2O_3$ is equal to or smaller than 20 parts by mass with respect to 100 parts by mass of a total content of the at least one epsilon-phase iron oxide-based compound selected from the group consisting of $\varepsilon\text{-}Fe_2O_3$ and the compound represented by Formula (1).

4. A magnetic recording medium comprising:
a non-magnetic support; and
a magnetic layer including the magnetic powder according to claim 1 and provided on the non-magnetic support.

5. Magnetic powder, comprising a compound represented by Formula (1),
wherein the magnetic powder has an average particle diameter of 8 nm to 25 nm, a ratio of Hc to Hc' is from 0.6 to 1.0, and Hc' satisfies Expression (II),
wherein Hc' represents a magnetic field at which a value of Expression (I) indicating a second derivative of magnetization M with respect to an applied magnetic field H becomes zero in a magnetic field-magnetization curve obtained by performing measurement at a maximum applied magnetic field of 359 kA/m, a temperature of 296 K, and a magnetic field sweeping speed of 1.994 kA/m/s, and Hc represents a magnetic field at which magnetization becomes zero in the magnetic field-magnetization curve;

$$d^2M/dH^2 \qquad \text{Expression (1)}$$

$$119 \text{ kA/m} < Hc' < 2380 \text{ kA/m} \qquad \text{Expression (II)}$$

$$\varepsilon\text{-}A_a Fe_{2-a}O_3 \qquad (1)$$

wherein, in Formula (1), A represents at least one metal element other than Fe, and a represents a number that satisfies a relationship of $0<a<2$, and
wherein a content of magnetic powder having a particle diameter equal to or smaller than 7.5 nm with respect to a total content of magnetic powder is equal to or smaller than 5% by number.

6. The magnetic powder according to claim 5, wherein the compound represented by Formula (1) is a compound represented by Formula (1-2), $$\varepsilon\text{-}A^1_x A^2_y A^3_z Fe_{(2-x-y-z)}O_3 \qquad (1\text{-}2)$$

wherein, in Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, $A^3$ represents at least one tetravalent metal element selected from the group consisting of Ti and Sn, x represents a number that satisfies a relationship of $0<x<1$, y represents a number that satisfies a relationship of $0<y<1$, z represents a number that satisfies a relationship of $0<z<1$, and $x+y+z<2$.

7. The magnetic powder according to claim 6, wherein a total content of at least one iron oxide-based compound selected from $\alpha\text{-}Fe_2O_3$ or $\gamma\text{-}Fe_2O_3$ is equal to or smaller than 20 parts by mass with respect to 100 parts by mass of a content of the compound represented by Formula (1).

8. A magnetic recording medium comprising:
a non-magnetic support; and
a magnetic layer including the magnetic powder according to claim 5 and provided on the non-magnetic support.

* * * * *